United States Patent [19]

Davis et al.

[11] 4,436,962

[45] Mar. 13, 1984

[54] CALL COVERAGE ARRANGEMENT

[75] Inventors: Richard A. Davis, Boulder; Susan K Harris, Northglenn; Bernard R. Jones, Arvada, all of Colo.

[73] Assignee: Bell Telephone Laboratories, Incorporated, Murray Hill, N.J.

[21] Appl. No.: 363,422

[22] Filed: Mar. 30, 1982

[51] Int. Cl.³ .......................... H04M 3/50; H04Q 3/64
[52] U.S. Cl. ........................... 179/18 B; 179/18 AD; 179/27 D; 179/27 FH
[58] Field of Search ........... 179/18 BE, 18 B, 18 BG, 179/27 D, 18 AD, 18 D, 18 FH, 27 FH

[56] References Cited

U.S. PATENT DOCUMENTS

| | | | |
|---|---|---|---|
| 4,150,257 | 4/1979 | Fenton et al. | 179/18 BE |
| 4,289,934 | 9/1981 | Pitroda et al. | 179/27 D |

FOREIGN PATENT DOCUMENTS

| | | | |
|---|---|---|---|
| 46224 | 2/1982 | European Pat. Off. | 179/27 D |

OTHER PUBLICATIONS

"Datapoint ISX ™ Information Switching Exchange", Datapoint ISX–Preliminary Product Specification–Version 1, May 1981, pp. 12-1 to 12-3, Document No. 61137.

"The Horizon ® Communications System–now better than ever", John A. Miller, Bell Labs Record, Mar. 1981, pp. 82–85.

"GTD–1000 Digital PABX CAS Main/ACD", Tapper et al., *GTE Automatic Electric Journal*, Nov. 1980, pp. 182–193.

*Primary Examiner*—Thomas W. Brown
*Attorney, Agent, or Firm*—J. W. Herndon

[57] ABSTRACT

A call coverage arrangement in a telephone system. Any station served by the system may be assigned to a call coverage group as a principal station. A coverage group includes the identities of a plurality of call covering stations for the principal station and an indication of the order of preference of the covering stations. Call coverage criteria are stored for principal stations specifying circumstances under which calls intended for the principal stations are redirected to coverage. A covered call is redirected sequentially to each of the covering stations in a coverage group in the order of preference until the call is answered or abandoned. The coverage criteria include options based on both the state of a principal's station (active, busy, idle, etc.) and the class of an incoming call (internal, external, priority). Principal stations are equipped with a "send all calls" button. The button may be operated while a call is arriving to redirect the call without waiting for automatic coverage to take effect. To give a caller control over the disposition of a call scheduled for coverage, the caller is alerted at the time a coverage criterion is satisified that the call is scheduled for coverage. Thereafter, a short time interval is provided during which the caller may abandon, activate the automatic generation and storage of a callback message or wait for the call to be redirected to coverage.

38 Claims, 41 Drawing Figures

FIG. 7

SND_XCTB (MSG SENDING TABLE)

| SND_XCT_TYPE | |
|---|---|
| SND_XCT_EXT<br>(CALLING STATION DIGITS) | |
| SND_XCT_BUF<br>(CALLED STATION DIGITS) | |

RCV_XCTB (MSG RECEIVING TABLE)

| RCV_XCT_STAT | RCV_XCT_TYPE |
|---|---|
| RCV_XCT_EXT<br>(STATION DIGITS) | |
| RCV_XCT_BUF | |
| RCV_XCT_MSG TYPE | |

FIG. 12

CALL PROCESSING STATE TABLE

| STATE | STIMULUS | NEXT ROUTINE |
|---|---|---|
| COV_REDIRECT_FEEDBACK_SINGLE | (1) LINE ANSWERED<br>(2) RFT TIMEOUT | NOTE 1.<br>CV_CRFI (FIG. 15) |
| CALLER_RESP_INTV_SINGLE | (1) SAC STIMULUS<br>(2) LINE ANSWERED<br>(3) CRI TIMEOUT | CV_SAC2 (FIG. 16)<br>NOTE 1.<br>CV_CRI1 (FIG. 15) |
| COV_USER_DA_ICOM_RING | (1) D/A TIMEOUT<br>(2) LINE ANSWERED<br>(3) SAC STIMULUS | CV_SAC1A (FIG. 17)<br>NOTE 1.<br>CV_SAC1 (FIG. 17) |
| ICOM_RING | (1) SAC STIMULUS<br>(2) NO STIMULUS | CV_SAC3 (FIG. 13)<br>NOTE 2. |
| PRINC_DA_ICOM_RING | (1) SAC STIMULUS<br>(2) D/A TIMEOUT<br>(3) PRINCIPAL ANSWER | CV_STA2 (FIG. 18)<br>CV_STA2A (FIG. 18)<br>PROCESS CONVENTIONAL CALL |
| TIME_LWC_ACT_TONES | (1) LWC CONFIRMATION TONE TIMEOUT | LWCBTN2B (FIG. 24) |
|  | (2) LINE IDLE | LWCBTN2B (FIG. 24) |

NOTE 1. REMOVE SIGNAL AND DISPLAY AT COVERING STATION, THEN CONNECT PARTIES BY NORMAL CALL PROCESSING.
NOTE 2. RING CALLED STATION, FEED BACK RING TONE TO CALLER.

CALL COVERAGE ARRANGEMENT CROSS-REFERENCE TO RELATED APPLICATION

The following applications have been filed simultaneously with this application:
1. Call Message Service; Ser. No. 363,469; J. L. Cottrell-D. J. Hill;
2. Implied Principal Addressing in a Call Coverage Arrangement; Ser. No. 363,423; J. L. Cottrell-R. A. Davis-S. K. Harris-B. R. Jones-J. Y. Payseur.

TECHNICAL FIELD

The invention pertains to telephone systems in general and, in particular, to telephone call coverage arrangements in telephone systems.

BACKGROUND OF THE INVENTION

Call coverage arrangements allow calls to a principal's telephone station to be answered by someone other than the principal for the purpose of receiving messages, etc. In the past, such arrangements typically consisted of a subscription to a call answering service or a bridged appearance of a principal's line at a secretary's station. More recently, other options have become available. For instance, the DIMENSION ® Private Branch Exchange System (DIMENSION is a registered trademark of American Telephone and Telegraph, Inc.), manufactured by Western Electric, Inc., offers two features called Call Forwarding—All Calls and Call Forwarding—Busy/Don't Answer. For both of these features, an incoming call is automatically forwarded to a telephone number specified by the principal at the time the feature is activated. The forwarding occurs immediately for the first mentioned feature, whereas for the latter feature forwarding occurs only if the principal's line is busy or if a call remains unanswered at the principal's station for a specified period of time. In addition, the DIMENSION PBX System offers a call pickup feature in which a call to a given station can be answered by another station in a call pickup group by dialing a special access code from the answering station.

The HORIZON Communications System (HORIZON is a registered trademark of American Telephone and Telegraph, Inc.), manufactured by Western Electric, Inc., extends the coverage concept further by allowing principals to prespecify in memory on a semipermanent basis one or more coverage stations to which calls to the principal station are simultaneously directed. The coverage feature of the HORIZON System operates as follows. Alerting of an incoming call at a principal station is performed by conventional ringing and flashing. Simultaneously, each of the stations of a prespecified coverage group is also flashed on a dedicated "coverage" button. The call may be answered at any of these stations. Presumably, the covering users at each station of the coverage group know their respective order of preference for covering calls to the principal station. Thus, after a certain period of time of principal nonanswer the first preferred covering user, if available, answers the call. After a longer time period of nonanswer, the second preferred covering user answers the call, and so on. Although this arrangement operates satisfactorily, it requires each covering user to observe and manually time, to some extent, the flashing of the coverage button. As an alternative, the system allows the principal station to be equipped with a "transfer ringing" option. Under this option, ringing is transferred sequentially to designated coverage group stations after specified periods of nonanswer. The flashing continues, however, at each of the coverage group stations until the call is answered or abandoned. In both the flashing and ring transfer arrangements, the distraction of each of the potential covering users throughout the ringing interval is undesirable.

Known telephone systems are also different in other areas of call coverage. For example, the known systems offer coverage only in principal "busy" or "does not answer" situations. As another example, some systems offer a "send all calls" (SAC) feature. For example, in the HORIZON system, a principal may request that ringing be transferred to the designated coverage stations without ringing the principal station. When a SAC button is operated on the principal station, all future arriving calls are automatically rung at the designated coverage stations. No known system, however, offers a SAC feature that operates with respect to calls that are ringing at a principal station when the feature is activated. Thus, a principal who normally answers his calls but who, for any reason, does not wish to answer one or more arriving calls at a particular time, must either answer or be disturbed by ringing until a "don't answer" period expires, a secretary answers or the calls are abandoned, depending on the coverage applicable to the principal.

SUMMARY OF THE INVENTION

The above problems are solved and an advance in the art is achieved in a call coverage arrangement for a telephone system. A set of call coverage criteria is stored in memory specifying conditions under which calls directed to a principal station will be redirected to coverage. The identities of a plurality of covering stations for the principal station are stored together with an indication of the order of preference of the covering stations. The coverage criteria are examined in response to a call to the principal station and, at such time as a criterion is satisfied, the call is redirected sequentially to each of the covering stations until the call is either answered or abandoned.

The illustrative system embodying the invention is a customer premises telephone system and specifically a private branch exchange (PBX). It is not necessary, however, that the invention be practiced in such a system.

The coverage criteria are comprehensive in comparison with the known art. Significantly, the criteria may be based on the class of an arriving call as well as the state of the principal station. A call to the principal station may be redirected immediately to coverage, or directed only to the principal station, or directed first to the principal station and then redirected to coverage if the principal station is not answered within a specified period of time, all in accordance with the coverage criteria which, as will be seen, include options based on both the class of the call and the state of the principal station.

In traditional telephone systems, a station has one line or a plurality of lines each associated with a different select button. In the illustrative system to be disclosed, a station may be equipped with a single line having plural call appearances each associated with a separate select button or plural lines each having plural call appearances. Each call appearance may simultaneously be associated with an independent call function. Thus, for example, a station might have a line with three call appearances on which at any given time one appearance might have a call on hold, the principal might be conversing with a caller on another appearance, while an incoming call might be ringing on the third appearance. If one or more of the call appearances of a station line are involved with a call function, the station line is defined to be in an active state. If all the call appearances are active, the station line is defined to be both busy and active. Illustratively, the coverage arrangement to be described generally operates with respect to a single station line. Thus, a station having plural lines may specify different coverage criteria for each line. To simplify this teaching and as an aid to an understanding of the invention, it is assumed throughout the discussion that each station served by the system is equipped with a single line which may have plural call appearances, it being understood that the claims are not to be so limited.

With the above as background, the illustrative coverage criteria may be more specifically defined. With respect to the state of a principal station, and in accordance with one preferred embodiment, a principal may specify that calls be redirected to coverage only if the station is "active", or only if the station is "busy", or only if the principal station is not answered within a specified period of time. With respect to the class of an incoming call, a principal may specify that only calls originated from stations served by the system (internal calls) be redirected to coverage, or that only calls originated from calls not served by the system (external calls) be redirected to coverage. The above call class coverage options may be combined in any way with the station state coverage options. Thus, if a principal desires, for example, only external calls directed to an "active" station will be redirected to coverage, or only internal calls directed to a "busy" station will be redirected. Similarly, all calls may be immediately redirected by selecting both "cover all internal calls" and "cover all external calls" options. As another example, a principal may elect that either external calls or internal calls, or both, be redirected only if the principal station doesn't answer within the specified period of time. In short, the principal has complete flexibility to specify the type of coverage criteria desired within the illustrative coverage environment.

There are certain classes of calls for which call coverage does not apply. As will be explained, one such class is a call from a covering party, such as a secretary at a covering station, to a principal station in response to a call for the principal station covered by the secretary. The principal may have opted to send all calls to coverage for screening and the secretary may wish to advise the principal to answer the call in question. To prevent the call from the secretary to the principal from also being redirected to coverage in accordance with the coverage criteria, the call is class marked as a "priority" call. This class of call is automatically preempted from coverage.

The "send all calls" (SAC) aspect of the coverage arrangement operates in part similarly to conventional systems. A principal can activate the feature by means of a dial access code or, for stations having feature buttons, by operating a dedicated SAC button. In either case, all future calls are redirected to coverage until the feature is deactivated. In accordance with one feature of the invention, the system expands the use of the SAC feature by making it functional with respect to one or more calls that are currently arriving at a principal station. Thus, a principal for which the SAC feature is not active may merely depress the SAC button to promptly dispose of an arriving call, if desired. The feature illustratively remains active thereafter until the button is again depressed. To redirect only an arriving call without retaining the feature active state, the principal need only depress the SAC button twice in succession.

The disclosed method also gives a caller control over the disposition of a call otherwise scheduled to go to coverage. Application ser. no. 363,469, filed simultaneously with this application and entitled "Call Message Service", discloses a message service that allows a caller or covering party to control the generation and storing of a callback message for a principal station. The message contains the date and time and the identity of the caller. This feature is referred to as "leave word calling" (LWC) and is activated by a dial access code or by the operation of a button on a station. The invention disclosed herein improves call coverage systems, in general, and the LWC feature. Before a call is redirected to a covering station, the calling station is alerted that the call is scheduled for coverage redirection and a quiet interval of time, called a caller response interval (CRI), is provided thereafter before the redirection is performed. The caller may elect to abandon the call or to wait for coverage at the expiration of the CRI. Alternatively, the called party may elect to activate the LWC feature during the CRI to cause the system to store a callback message for the principal in lieu of coverage.

It is possible to provide other options for the caller during the CRI, if desired. For example, a "GO TO COVER" button could be provided on a caller's station so that a caller could cancel the CRI and initiate redirection immediately if desired. This would avoid the necessity of forcing an experienced caller to wait for expiration of the CRI if the caller elects to talk to a covering user.

BRIEF DESCRIPTION OF THE DRAWINGS

In the drawing:

FIGS. 4 through 8 show pertinent data table layouts used by the program to control the system of FIG. 1;

FIG. 12 lists pertinent software states defining states of calls during processing in the system. Pertinent stimuli which cause call processing activity to be executed for a call are also listed for each of the call processing states, together with an identification of program routines described herein which are executed as a result of the stimulus;

DETAILED DESCRIPTION

Figure 16:
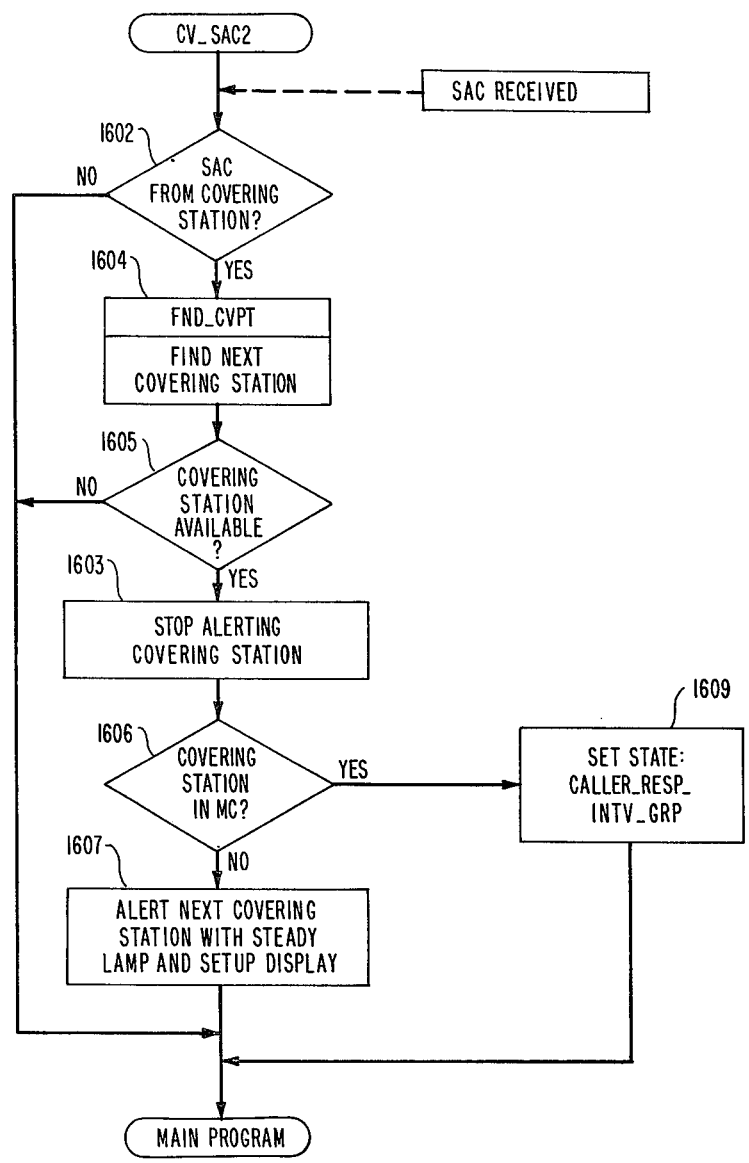

In the drawing, the first digit of three digit designation numbers and the first two digits of four digit designation numbers reference the figure number in which the corresponding element appears. Thus, elements 305 and 1602, for example, appear in FIGS. 3 and 16, respectively.

Figure 1:
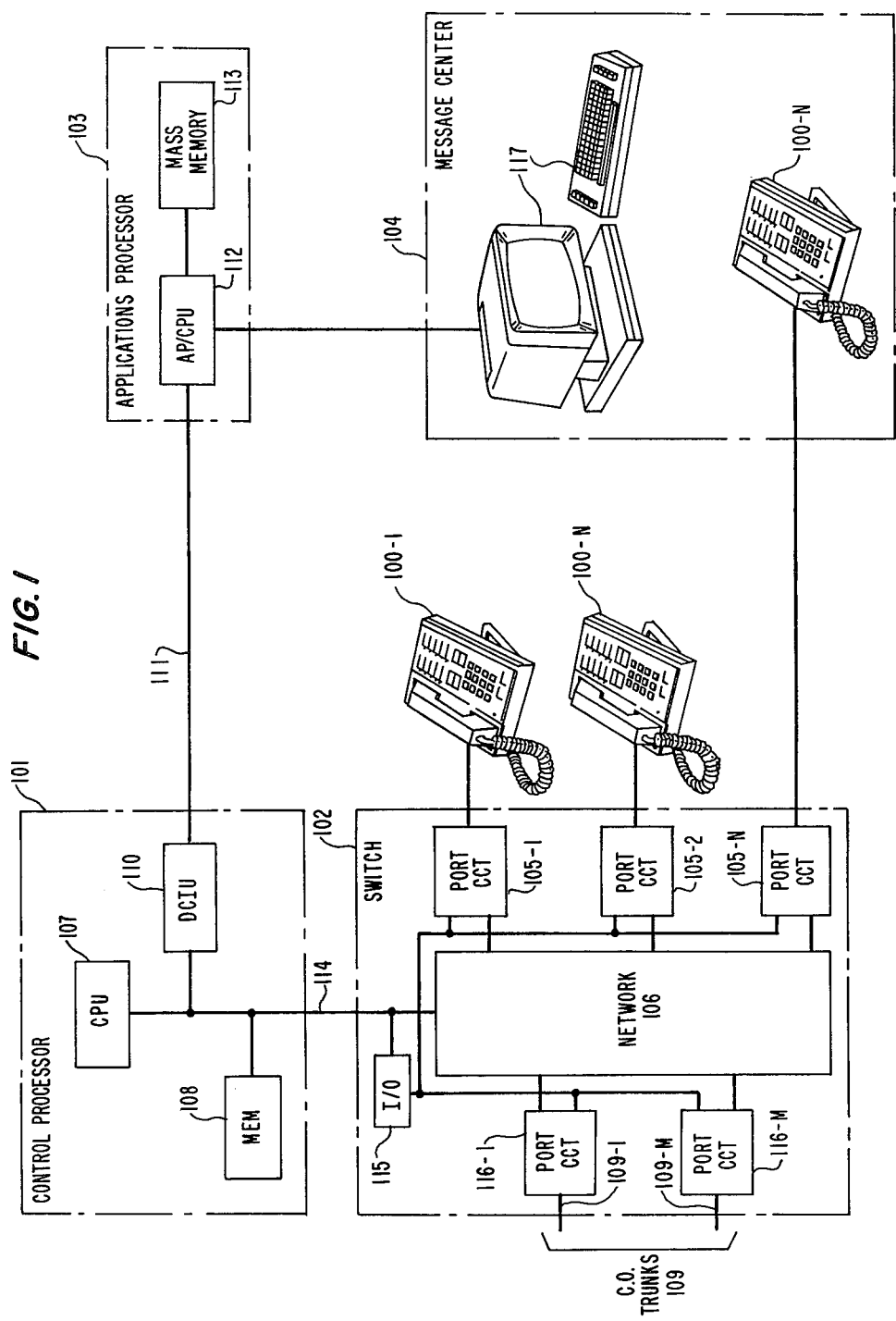
FIG. 1 shows a block diagram of an illustrative customer premises telephone system in the form of a private branch exchange in which the invention might be practiced.

FIG. 1 shows one digital communications system in which the invention may be embodied. The system includes four major components—a control processor 101, a switch 102, an applications processor (A/P) 103 and a message-center (MC) 104. The control processor 101 includes a central processing unit (CPU) 107, which might be any of a number of commercially available processors, which using instructions and data stored in memory 108, controls the major operations of the system. In particular, CPU 107 controls the operations of switch 102 by means of channel 114. In addition, control processor 101 communicates with the AP 103 by means of a data connection including a digital channel interface unit (DCIU) 110 and a digital data channel 111.

Switch 102 is a digital switching network comprising a time division network 106 which provides time-slot interconnections between internal stations, such as 100-1 to 100-N, and between the internal stations and trunks 109 to a local central office (not shown). Each of the internal stations and trunks connect to network 106 by means of interface port circuits 105 and 116. CPU 107 communicates with the stations and trunks by means of these port circuits via connection 114 and input/output interface circuit 115.

DCIU 110 interfaces CPU 107 and AP 103 over a data access channel. AP 103 comprises its own central processing unit AP/CPU 112 which can be implemented by a commercial microprocessor and a mass memory 113 for administering data-intensive features, such as leave word calling (LWC) and message center 104 management. LWC messages, for example, are stored and retrieved from mass memory 113. A DCIU interface program, which is not discussed in detail, controls the transmittal and reception of data to and from the AP. Mass memory 113 might be any of a number of commercially available disc systems.

MC 104 illustratively serves as a final covering point for calls directed to principal stations. A detailed understanding of the MC is not necessary for an understanding of the invention and will be described only generally. The system may have a plurality of MCs although only one is shown for simplicity. An operator position in the MC comprises a station such as 100-N and a visual display terminal and keyboard 117. Only one of these positions is shown in FIG. 1 although an MC may contain several operator positions. The stations of an MC are accessed as part of a uniform call distribution (UCD) group. A call directed to a principal station and which is redirected to MC 104 for coverage arrives at a station such as 100-N. At the same time, CPU 107 informs AP 103 of the covered call at station 100-N and the principal station for which the call is intended and the reason for call redirection. In response, AP 103 accesses a data file in mass memory 113 pertaining to the principal station and displays information at terminal 117. This displayed information illustratively includes the station identification and name of the principal party, the reason the system redirected the call to coverage, and any textual information the principal may have included in the data file. The textual information may include, for example, the principal's whereabouts, when he or she may return, a message for a particular calling party, and the like. The displayed information at terminal 117 may also include information identifying the calling party.

The displayed information enables the MC operator to answer the call intelligently as if the operator were the principal's secretary. The operator may input a message from the calling party directly into the principal's data file via terminal 117.

Figure 2:
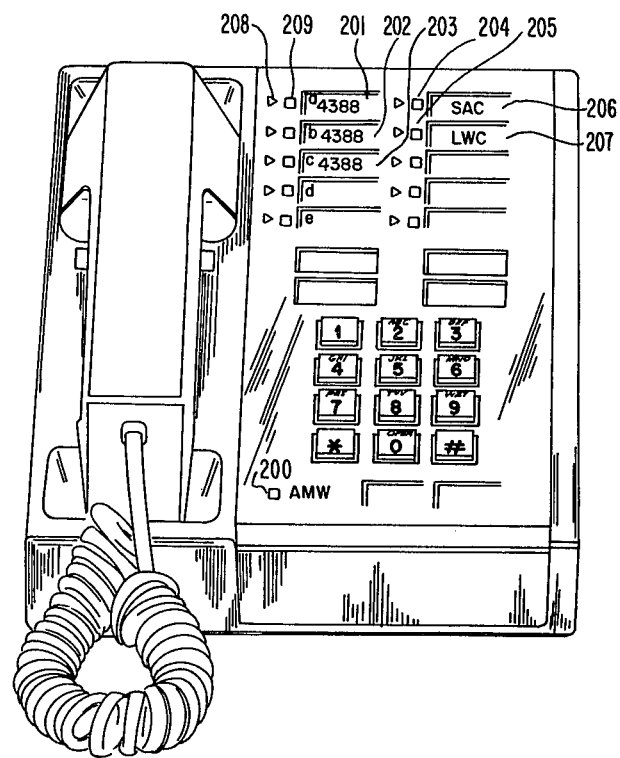
FIGS. 2 and 3 show illustrative telephone stations which are used in the system of FIG. 1.

Illustrated in FIG. 2 is a typical multifunction station that might be used by a principal. Stations used in the illustrative system may be either analog or digital. Special features such as leave word calling (LWC) and send-all-calls (SAC) can be activated from either an analog or digital station. Feature activation buttons are provided on multifunction stations. However, features may be activated by dial access codes (DAC) from any station. The station in FIG. 2 has three call appearance select buttons 201 through 203, associated with its single line station number 4388. Independent calls may exist on each of these call appearances simultaneously, although only one call can be in a talking state. Lamps 208 associated with each call appearance are called I-use lamps and reflect a call appearance that has been selected by an operation of the associated select button. Lamps 209 are status lamps and are lit steady or flashing to indicate call appearance status such as ringing, talking and hold states.

In general, most of the buttons on the FIG. 2 station may be assigned as call appearances or as special feature buttons, as desired. Illustratively, the depicted station has buttons 206 and 207 assigned as activating buttons for the SAC and LWC features. When the SAC feature is activated by operating button 206, all calls that are incoming to the station, both future calls and calls that are currently arriving, are redirected to coverage according to coverage information stored in the system pertaining to this station. The SAC feature is deactivated by operating button 206 a second time. The LWC button 207 activates the LWC feature. The I-use lamps are not used for these feature buttons. The status lamp 204 associated with the SAC button is lit steady whenever the feature is activated. LWC status lamp 205 is lit during a call in response to the successful generation and storage of an LWC message. Lamp 205 is extinguished at the end of the call. This lamp is fluttered if an LWC attempt is unsuccessful or invalid.

If an LWC message is successfully generated and stored for the principal associated with the station in FIG. 2, the principal is alerted of the message by the illumination of AMW lamp 200 located at the bottom left of FIG. 2. By way of example, this station does not include a message retrieval display. To retrieve the message, the principal might call his or her secretary, if any, who has a display, or the MC.

Figure 3:
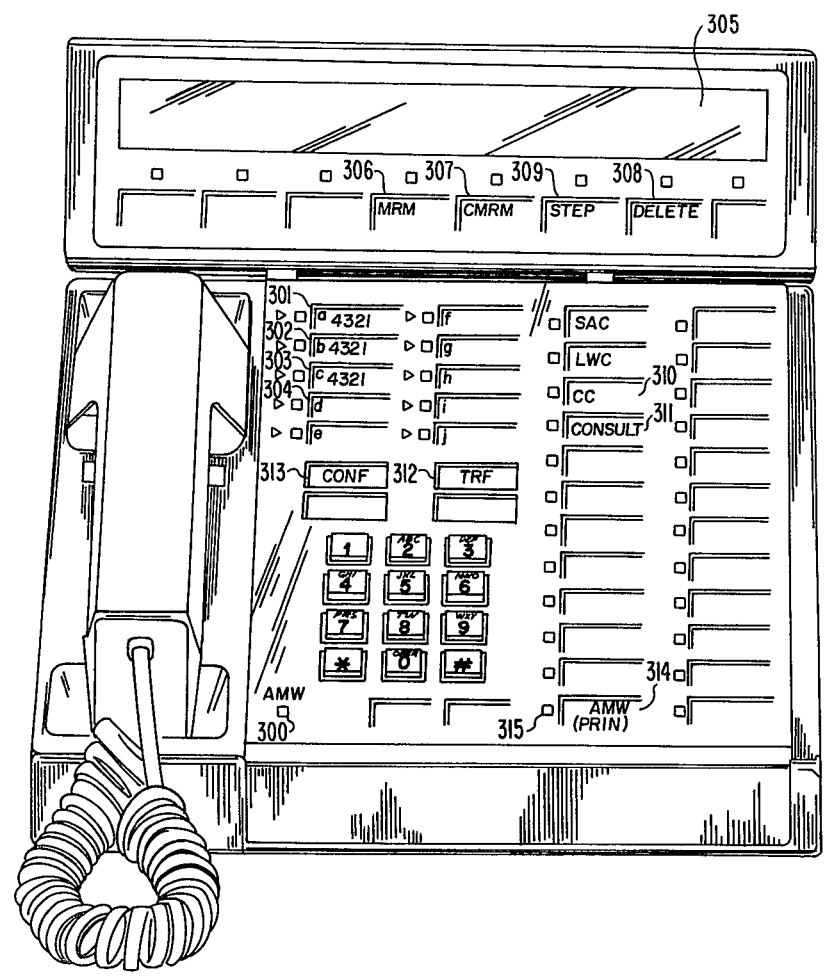

FIG. 3 shows a station typically used by a secretary. It includes essentially the same features as the set in FIG. 2. In addition, this station embodies several features especially pertinent for a secretary.

One such feature is an illustrative 40 character alphanumeric display module 305 used to retrieve LWC and CC messages, as well as MC messages that will fit the 40 character display. The display module may be plugged into the station or the station may stand alone. Messages for the principal of the station (e.g., the secretary) may be obtained by operating the MESSAGE/RETRIEVAL MODE (MRM) button 306. If the station is included in the coverage path of one or more principal stations, then messages for those principal stations may be obtained by operating a COVERAGE MESSAGE RETRIEVAL MODE (CMRM) button 307. After a message is displayed, the message may be erased from storage by an operation of DELETE button 308. Otherwise, the message remains stored for retrieval at a later time. An operation of STEP button 309 causes the next stored message or a no further messages indication to be displayed.

In addition to LWC and SAC buttons, the station of FIG. 3 illustratively includes a coverage callback (CC) button 310 and a consult button 311. Both buttons are operative only with respect to a call which is being covered at the station. The CC button causes an LWC type message to be generated and stored. The principal is requested to call the calling party instead of the covering party as in the case of a LWC button operation at the covering station.

The consult button allows the covering party to call the principal station for which a covered call was intended on a priority basis. To activate this feature, the covering agent depresses first either a transfer button 312 or a conference button 313 to put the covered call on hold. This action also causes the system to select an idle call appearance. An operation of the consult button 340 now causes a call to be placed automatically to the principal station on the selected call appearance. The consult call is not subjected to call coverage redirection because of its priority status. A subsequent operation of the conference or transfer buttons connects the calling, principal and covering stations or the calling and principal stations, respectively.

Any of the nondedicated buttons on a covering station, such as button 314, may be used for automatic message waiting (AMW) for a principal station. In such a case, the button is nonfunctional and the associated lamp, such as 215, is lit whenever the AMW lamp on the principal station is lit.

TABLE DESCRIPTION

Figure 4:
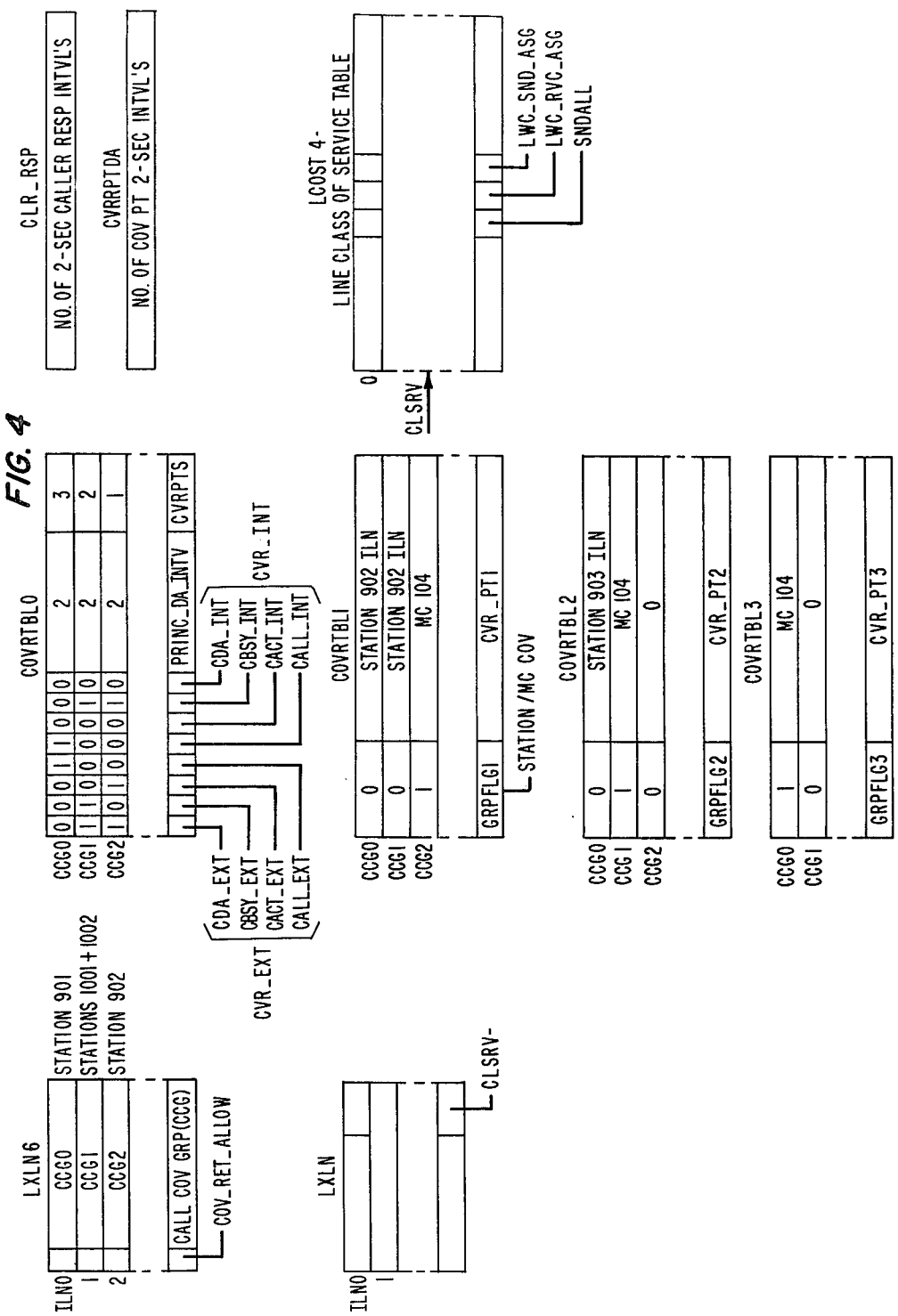

FIGS. 4 through 8 show certain data tables used by the system program in processing calls. In view of our simplifying assumptions that system stations are equipped with one line which might have plural call appearances, the terms "station" and "station line" are used interchangeably in the remainder of this document. FIG. 4 contains parameter tables defining system parameters defined by the system customer. A given station line in the system for which coverage is defined is assigned to a call coverage group (CCG). Any number of coverage groups may be defined by the customer. Table LXLN6 contains a storage word for each call appearance in the system defining the coverage group applicable to that call appearance. A call appearance is identified by an internal line number (ILN) which is arbitrarily assigned. Thus, for example, one call appearance of station 901 (see FIG. 9) is assumed to be assigned to ILN 0, which references the first word in LXLN6 and is assigned to CCG 0. Every word in LXLN6 pertaining to a call appearance on the same station line would have the same CCG number stored therein. Each word of LXLN6 also contains a flag COV_RET_ALLOW defining whether or not any covering station in the CCG for this principal station line with a display module is allowed to retrieve the principal's LWC messages.

A second table LXLN contains a word for each ILN. Each word contains a line class of service indicator CLSRV for the appropriate station line. CLSRV contains a number defining a feature capability for the line. CLSRV is used as an index to address a line class of service table LCOST4 which specifically defines certain capabilities for a the line. Only capabilities pertinent to this disclosure are shown in LCOST4. Specifically, a flag SNDALL defines whether or not the SAC feature is allowed to be activated for a given line. A flag LWC_SND_ASG defines whether or not the LWC feature can be activated from a line, and a flag LWC-RCV-ASG defines whether a line is authorized to have LWC messages stored for the line as a principal.

Four coverage tables COVRTBL0 through COVRTBL3 are shown. Each is indexed by a CCG number obtained from LXLN6. COVRTBL0 contains the call coverage criteria applicable to a station assigned to an applicable CCG. Each word of the table contains two groups of criteria. The first group CVR_INT pertains to criteria applicable to internal calls (calls from stations served by the system). Within this group are a CDA_INT flag meaning "cover internal calls when the principal station is not answered", CBSY_INT meaning "cover internal calls when the station is busy", CACT_INT meaning "cover internal calls when the station is active", and CALL_INT meaning "cover all internal calls." The second group CVR_EXT contains flags corresponding to the internal call flags above but pertaining to external calls (calls from stations not served by the system) to a principal station.

In addition, each word of COVRTBL0 contains in CVRPTS the number of coverage stations defined for the respective CCG and in PRINC_DA_INTV the number of 2-second intervals during which to ring a principal station before redirecting a call to coverage if the principal station has a cover on doesn't answer (D/A) (external or internal) criterion.

COVRTBL1 contains information pertaining to the first covering station for each of the CCGs. A flag GRPFLG1 contains a 1 if the first covering station is located in a message center (MC) and a 0 if the first covering station is an individual station.

In addition, each word in COVRTBL1 has an indicator CVR_PT1 containing the ILN of the first covering station, or an MC number, such as 104, if the covering station is part of a MC. If no covering station is defined for the CCG, CVR_PT1 contains 0.

COVRTBL2 and COVRTBL3 contain the same information as COVRTBL1 for the second and third covering stations (if any) for each of the CCGs.

As will be described, before a call is redirected to coverage, the calling party is alerted of this fact and a time interval called the caller response interval (CRI) is provided thereafter and before the call is actually redirected to allow the calling party time to activate an LWC message, for example, in lieu of going to coverage. The number of 2 second intervals selected by the customer as the CRI are stored in table CLR_RSP.

Once a call has been redirected to coverage, the call is allowed to ring at a covering station for only a prescribed time interval before the call is redirected to the next covering station (if any). The number of 2 second intervals forming this interval is stored in table CVRRPTDA.

Figure 5:
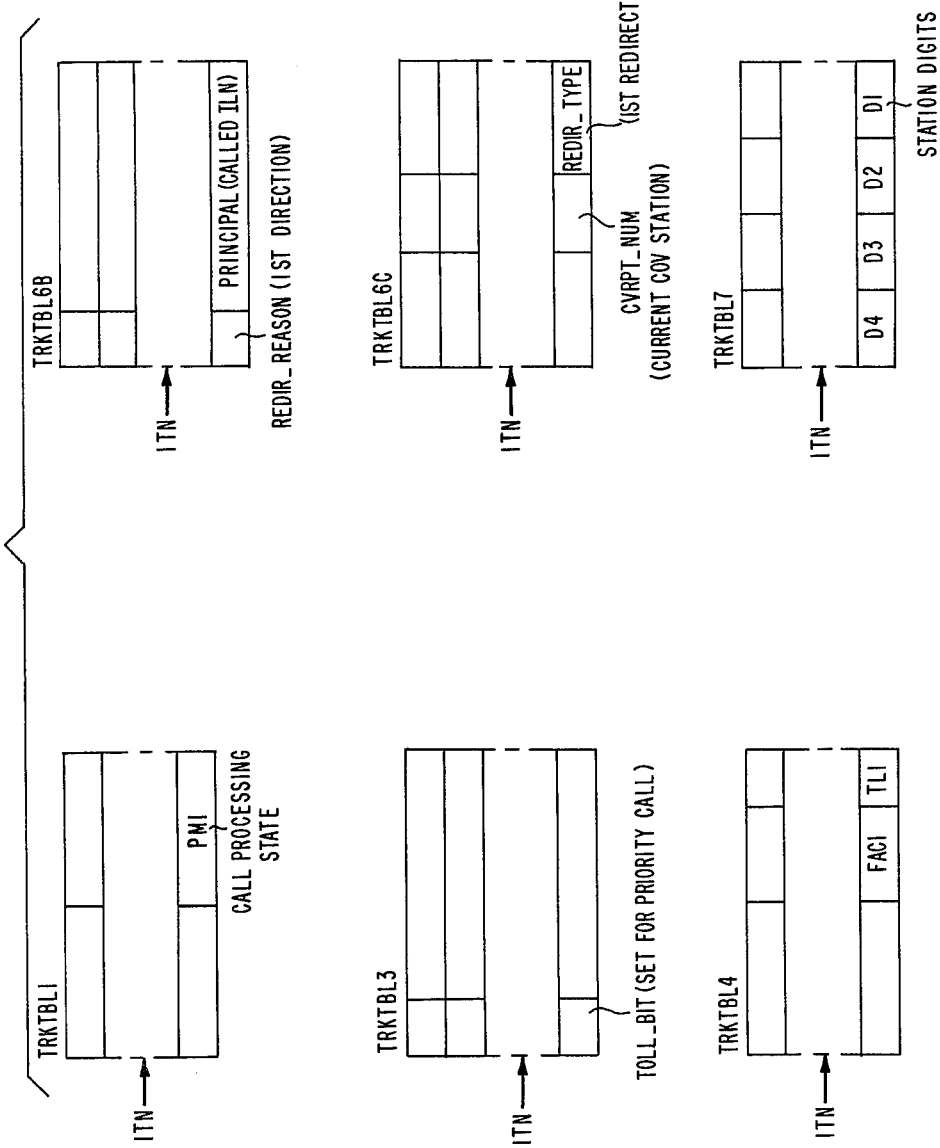

FIG. 5 shows a number of tables collectively referred to as the trunk tables. Each trunk table is indexed by an internal trunk number (ITN). The collection of words from each trunk table pertaining to a given ITN forms a trunk record. Every call in the system is associated with an individual trunk record. Only items of interest to this disclosure are shown in each of the trunk tables.

Trunk table TRKTBL1 contains an indicator PM1 (call processing state mark) which contains encoded information defining the current call processing state of an associated call in the system. Pertinent call processing states are shown in FIG. 12.

TRKTBL3 contains a priority flag TOLL_BIT. A call is marked as a priority call by setting $TOLL_{14}$ BIT whenever it is desirable to avoid the possibility that the call will be redirected to coverage. One such type of call is a consult call from a covering station to a principal station during a covered call for the principal station. In such a case, the consult call should not also be redirected to coverage if a principal station coverage criterion happens to be satisfied.

TRKTBL4 contains a flag TL1 specifying whether a call is an internal or an external call. For an internal call, an item FAC1 in TRKTBL4 contains the ILN of a calling internal station. A similar arrangement is provided for FAC1 for external calls.

TRKTBL6B contains an item PRINCIPAL which stores the ILN of a station called as a principal station. If a call has been redirected to coverage, an item REDIR_REASON contains encoded information specifying which coverage criterion was satisfied causing the redirection.

TRKTBL6C contains an item REDIR_TYPE which contains 0 if a call has not been redirected and otherwise a number identifying whether other call options such as call forwarding or call pickup has occurred on the call. In addition, TRKTBL6C contains in CVRPT_NUM the sequence number, i.e. first, second or third covering point, of a current covering station, if applicable, on a call.

TRKTBL7 contains the dialed digits D1 through D4 of a called station directory number.

Figure 6:
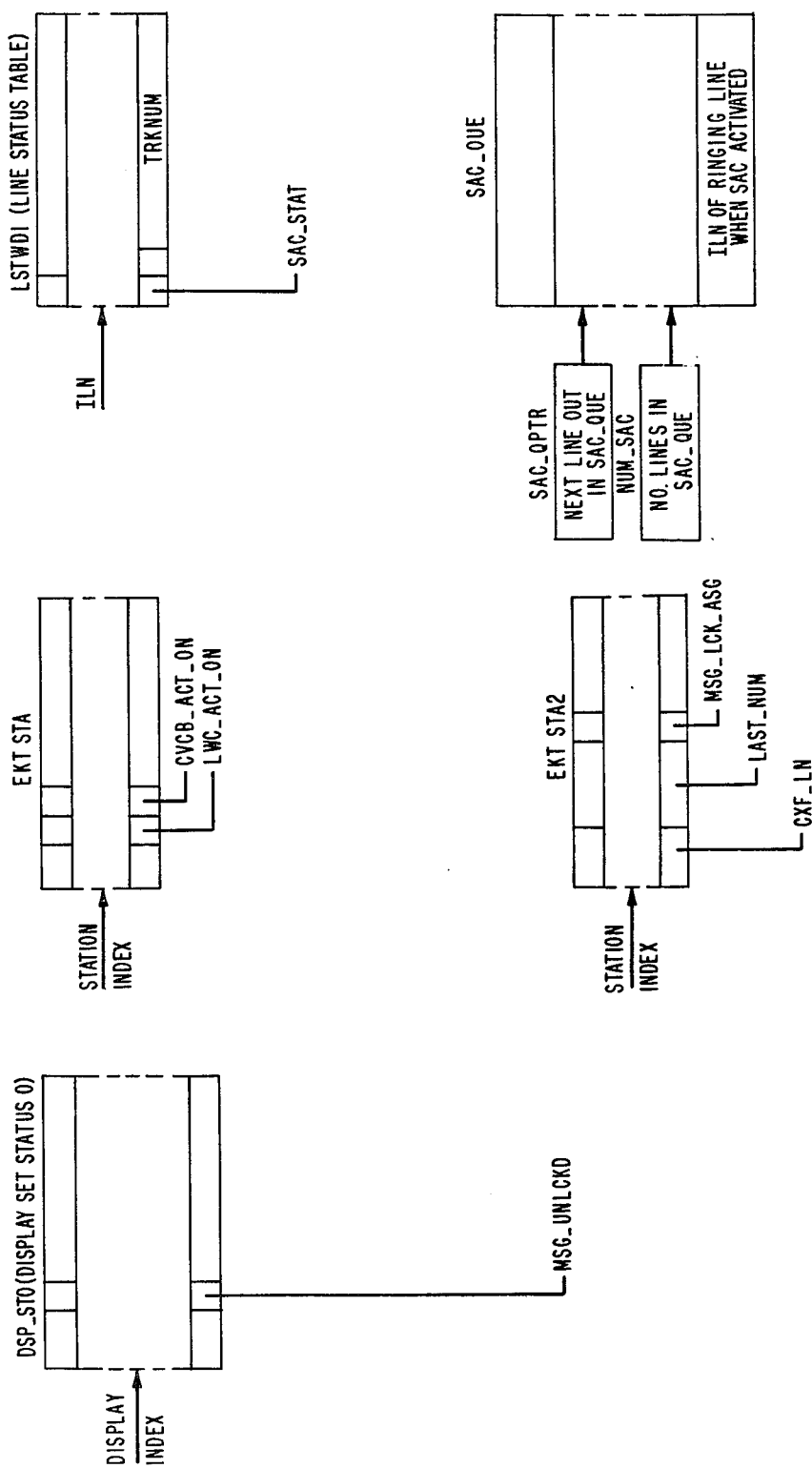

FIG. 6 shows a line status table LSTWD1 indexed by ILN. Each word contains a SAC_STAT flag set to 1 if a SAC feature has been activated. In addition, each word contains an item TRKNUM which stores the ITN index to the trunk tables for a call pertaining to a given station.

When the SAC feature is activated at a station, any call that is in the alerting phase at the station at that time is automatically redirected to coverage. There may be several stations requiring call redirection due to SAC activation during the same relative time period. Because of real-time considerations in the system, each such call is redirected sequentially in a way to cause the least system real-time impact. This is accomplished in part by generating a SAC stimulus for each of the calls to be redirected from any station. Each stimulus is loaded into a separate word of table SAC_QUE and each stimulus is processed as a separate call processing activity. The beginning and end addresses of the active words requiring processing in SAC_QUE are derived from tables SAC QPTR and NUM_SAC.

The remaining tables of FIG. 6 contain information pertaining primarily to the LWC feature. EKT_STA contains a flag LWC_ACT_ON which is set whenever an LWC message is successfully stored for a principal station. If LWC is activated as a result of a COVERAGE CALLBACK (CC) button operation at a covering station, the flag CVCB_ACT_ON is set instead. EKT_STA2 contains a flag MSG_LCK_ASG which is set if a station is authorized to be locked. EKT_STA2 also contains an item CXF_LN which stores an identification of a select button placed on hole in response to the operation of the consult button at a covering station. This item is used in identifying a principal station on a covered call for use in implied principal addressing. In addition, whenever an internal call is made from a multifunction station, the dialed station digits are routinely stored in item $LAST_{14}$ NUM. MSG_UNLCKD in table DSP_STO is 0 when a corresponding station is locked, thereby preventing message retrieval or cancellation from that station until it is unlocked. These tables are indexed by a station index number which identifies the station rather than a call appearance on a station which is identified by ILN.

FIG. 7 shows tables used to transfer LWC, CC and MC related information between the control processor 101 and the applications processor 103 of FIG. 1 via the data channel interface unit (DCIU) 110. Message sending table SND_XCTB contains an item SND_XCT_TYPE which stores an encode describing the type of information transmitted to the AP. Four types of transmittals are of interest here: (1) an LWC or CC message being sent to the AP for storage; (2) a request to cancel an LWC or CC message pertaining to specified calling and principal stations; (3) an LWC or CC message retrieval request; or (4) a message delete request. A cancel request removes messages from storage before a principal has retrieved it. A delete request removes a message after display. For LWC and CC message storing, deleting and cancelling transmittals, item SND_XCT_EXT contains the directory number of the station requesting callback from the principal station and item SND_XCT_BUF contains the directory number of the principal station. Since LWC and CC messages are predefined types of callback request messages, no message text is sent to the AP. For message retrieval requests, only the principal (or requesting) station need be identified in SND_XCT_EXT.

Message receiving table RCV_XCTB is used to transmit both LWC or CC messages and in certain cases MC messages from the AP to the control processor for display at the appropriate principal display modules. The table is also used to transmit automatic message waiting lamp update information for principal stations. Item RCV_XCT_TYPE contains encoded information identifying whether a given transmittal contains a message, whether the included message is the last message for a station, or whether there are no messages. The principal station is identified in item RCV_XCT_EXT. RCV_XCT_TYPE also identifies a message waiting update transmittal. In this case, item RCV_XCT_STAT contains an on/off state for updating the message waiting lamp for the principal station. Encoded information in RCV_XCT_MSGTYPE identifies whether the transmittal is an LWC/CC message or an MC message. Any message text, such as from an MC, is stored in RCV_XCT_BUF.

A given station may have up to three appearances of its automatic message waiting (AMW) lamp. This allows a principal station to have an AMW lamp and for up to two other stations to have AMW lamps for the principal station also. AMW lamps on multifunction stations are updated by sending control signals directly to the stations. Provision is also made for stations not equipped with multifunction buttons to be equipped with AMW lamps. In this case, AMW lamps are controlled from the associated station line circuits which have wiring to the lamps.

Figure 8:
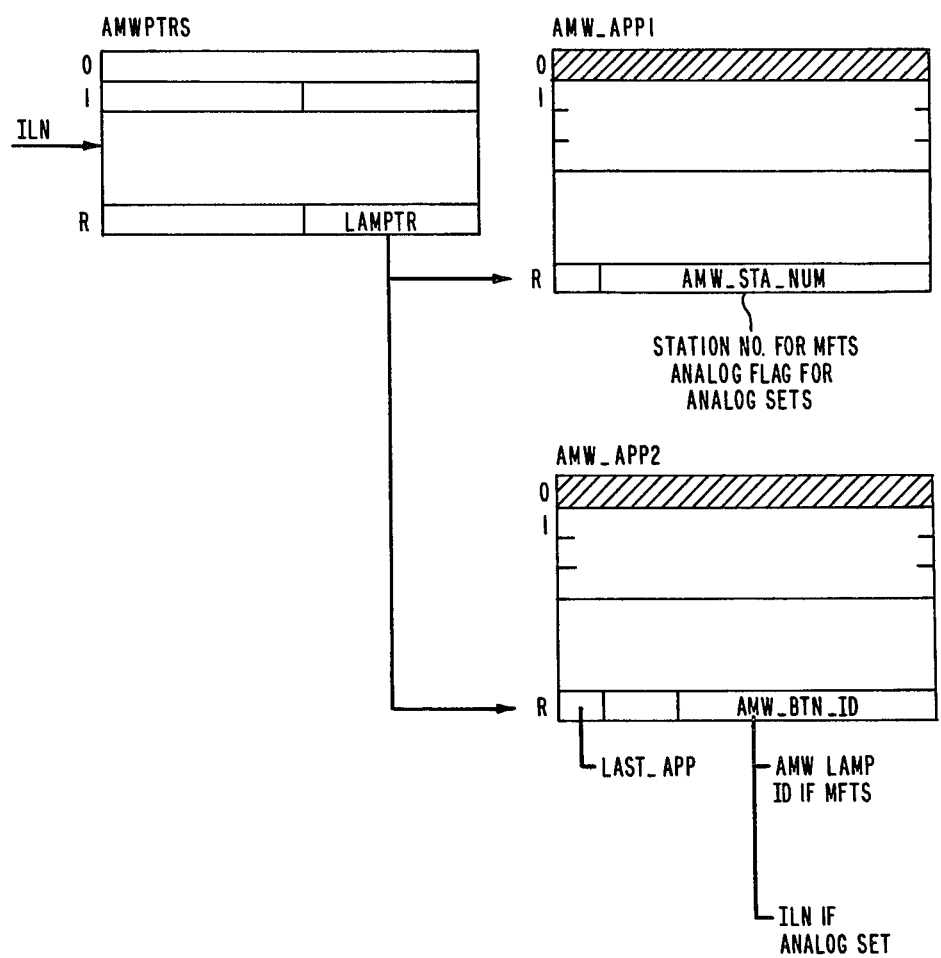

The tables in FIG. 8 allow the automatic update of all message waiting lamp appearances on the stations. Table AMWPTRS is indexed by the ILN of a station in response to a lamp update transmittal from the AP to retrieve an item LAMPTR. LAMPTR points to the appropriate location in tables AMW_APP1 and AMW_APP2 for the principal station. These tables may have 1, 2, or 3 words per station corresponding to the number of appearances of the principal station AMW lamp. This is illustrated by entry 1 in tables AMW_APP1 and AMW_APP2, which is shown to have 3 words for 3 lamp appearances, and by entry R which has only one word for a single lamp appearance. A single lamp appearance would appear in most instances on its principal station. An item LAST_APP in table AMW_APP2 flags the last entry in the table pertaining to any given station line. Item AMW_STA_NUM in table AMW_APP1 contains a station number for multifunction button stations or a flag for other stations. If AMW_STA_NUM identifies a multifunction station, AMW_BTN_ID contains an AMW lamp identification by means of which the lamp may be controlled. Otherwise, AMW_BTN_ID contains the ILN of a non-multifunction station, by means of which the appropriate line circuit may be addressed to control the AMW lamp.

PROGRAM DESCRIPTION

Figure 9:
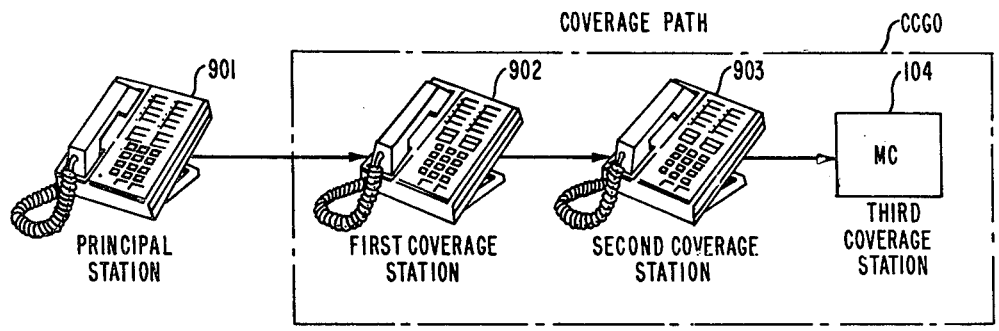
FIGS. 9, 10 and 11 symbolically illustrate certain ones of the stations in their status as principal stations and illustrative call coverage paths for each of the principal stations.
Figure 10:
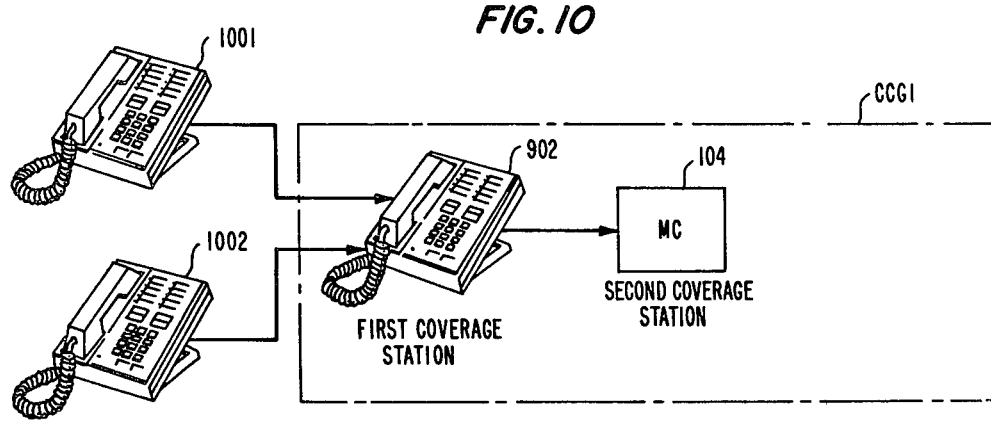
Figure 11:
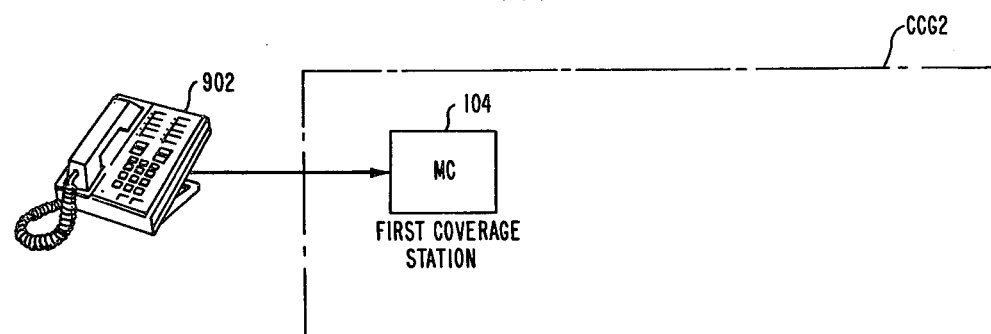

FIGS. 9 through 11 show illustrative ones of stations 100, here identified as 901, 902, 1001 and 1002, in their status as principal stations and illustrative call coverage group (CCG) assignments for these principal stations. These assumed assignments are used herein as examples for discussing the operation of the system. In FIG. 9, station 901 is assigned to CCG0. CCG0 consists of stations 902, 903 and MC 104 as the 1st, 2nd and 3rd covering station points, respectively.

Stations 1001 and 1002 are assigned to CCG1, shown in FIG. 10. CCG1 consists of only two covering station points. The first covering station point is station 902, which is also the first covering point in CCG0. The second covering station point in CCG1 is MC 104.

Station 902, although a covering station in CCGs 0 and 1, also has a status as a principal station, as all stations in the illustrative system. FIG. 11 shows that tation 902 is assigned to CCG2 which has only MC 104 as a covering point.

In accordance with the above assumed coverage arrangement, calls to stations 901, 1001 and 1002 will first be covered by station 902, if available. Calls to station 901 will be secondarily covered by station 903 if 902 is unavailable, and finally by an operator at MC 104. Calls to stations 1001 and 1002 will be secondarily covered by MC 104 if station 902 is unavailable. Calls to station 902 as a principal station will be covered by MC 104.

The data shown in call coverage tables LXLN6 and COVRTBL1 through COVRTBL3 in FIG. 4 illustratively set forth the above coverage arrangement for CCGs 0, 1 and 2. In addition, as shown in table COVRTBL0, it is assumed for illustration that all internal and external calls to CCG0 principal stations are immediately covered (CALL_INT and CALL_EXT). All external calls to CCG1 stations are covered when the stations are busy or not answered and internal calls are covered when stations are busy (CBSY_EXT, CBSY_INT, CDA_EXT). CCG2 stations have only external calls covered when the stations are active or do not answer and internal calls are covered or busy.

CALL COVERAGE

For purposes of illustration, consider an internal call from station 1001 to station 901. FIG. 9 shows that station 901 has a coverage path consisting of stations 902, 903 and MC 104. Recall that station 901 has elected to have all internal and external calls covered immediately. Assume that covering station 902 is unattended, and that covering station 903 has its SAC feature active.

Figure 13:
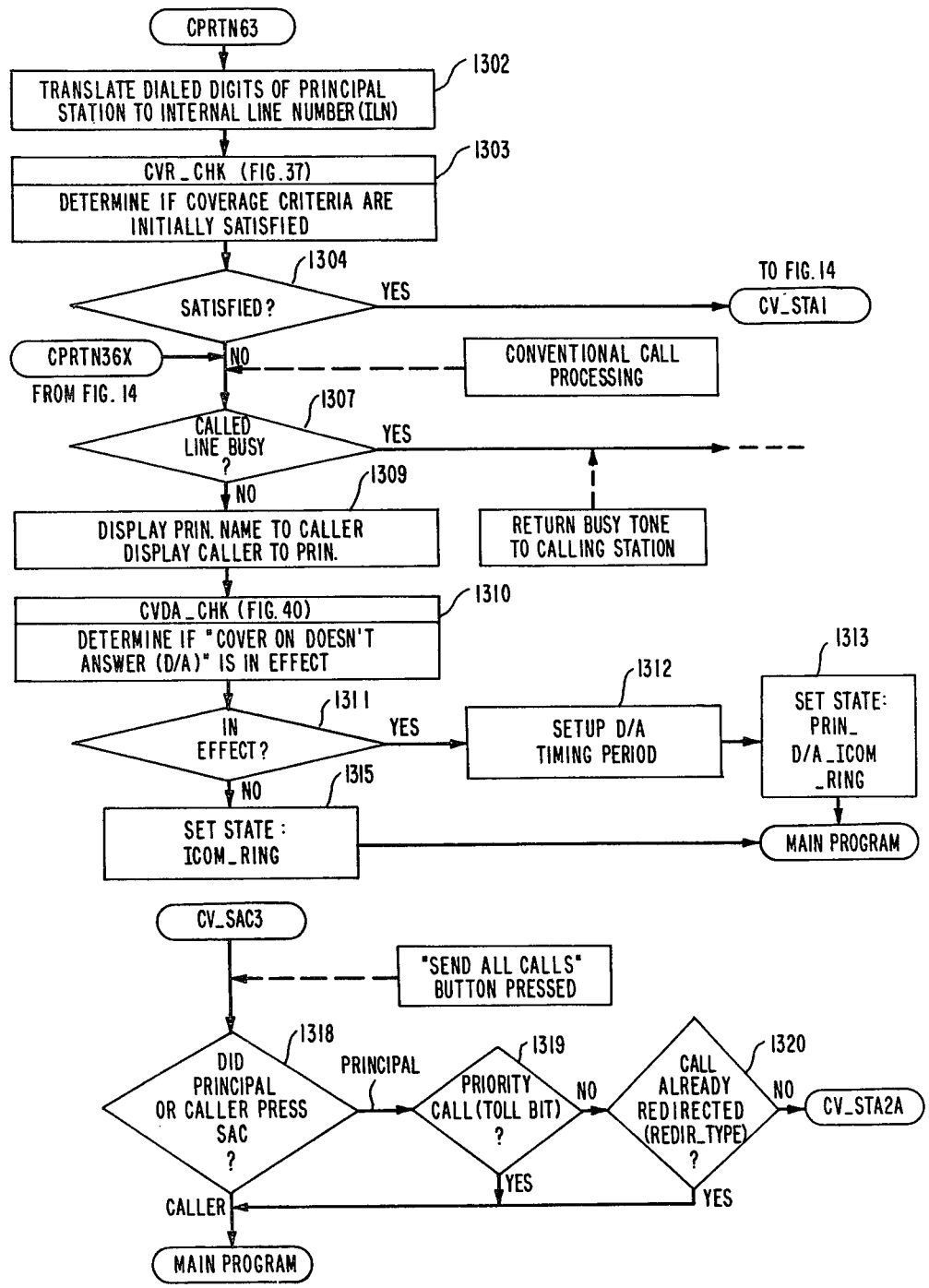
FIGS. 13 through 21 show flowcharts for program routines which control primarily the call coverage path redirection aspects of the FIG. 1 system.

FIG. 13 depicts the program (CPRTN63) entered in response to the dialing of the station 901 number from station 1001. The dialed station number is translated at step 1302 into the internal line number (ILN) of principal station 901. CPRTN63 next calls the CVR_CHK subroutine at step 1303 to determine if any coverage criterion is initially satisfied.

Figure 37:
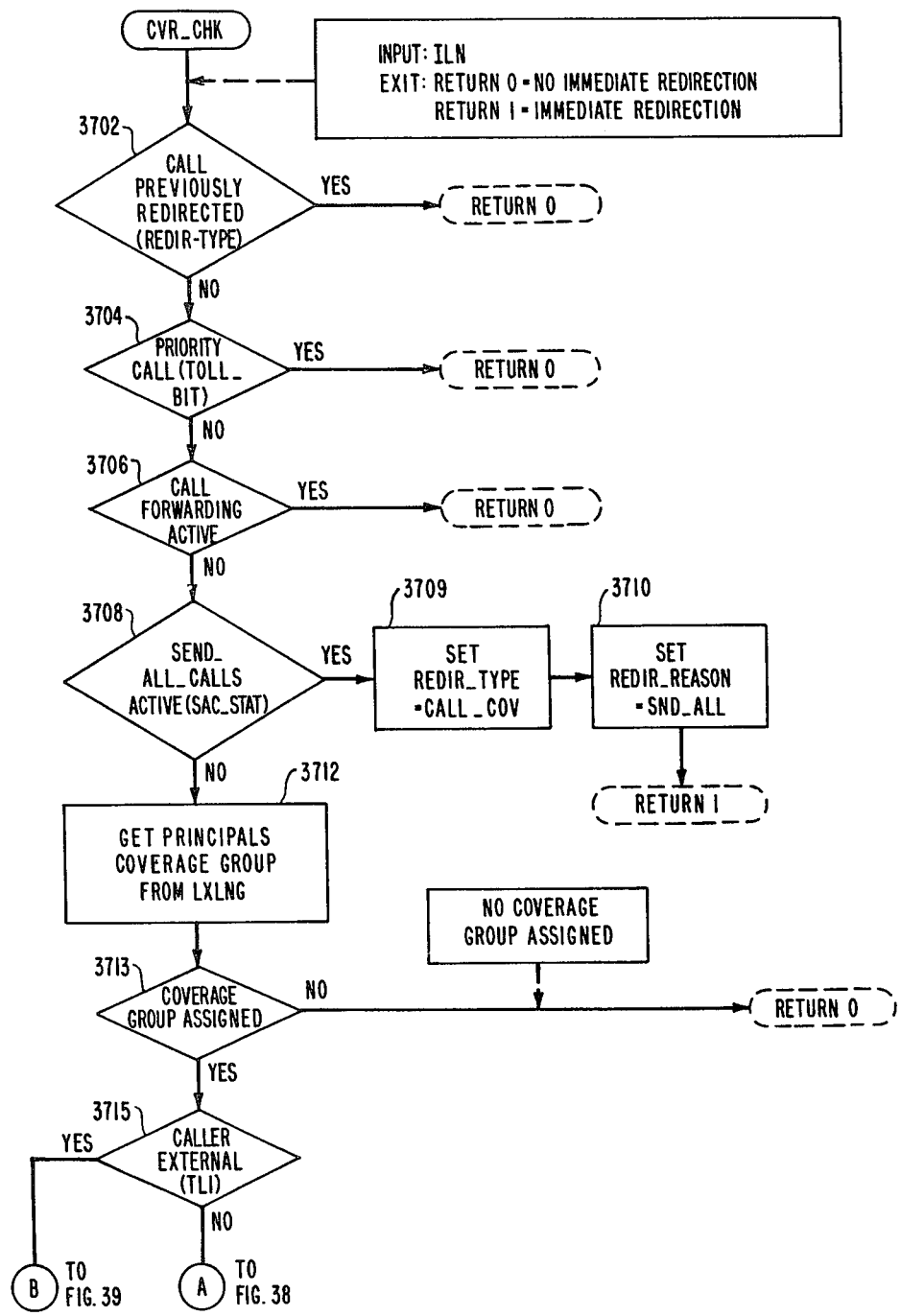
FIGS. 37 through 41 show flowcharts of several subroutines which are called at various places in the foregoing program structure.
Figure 38:
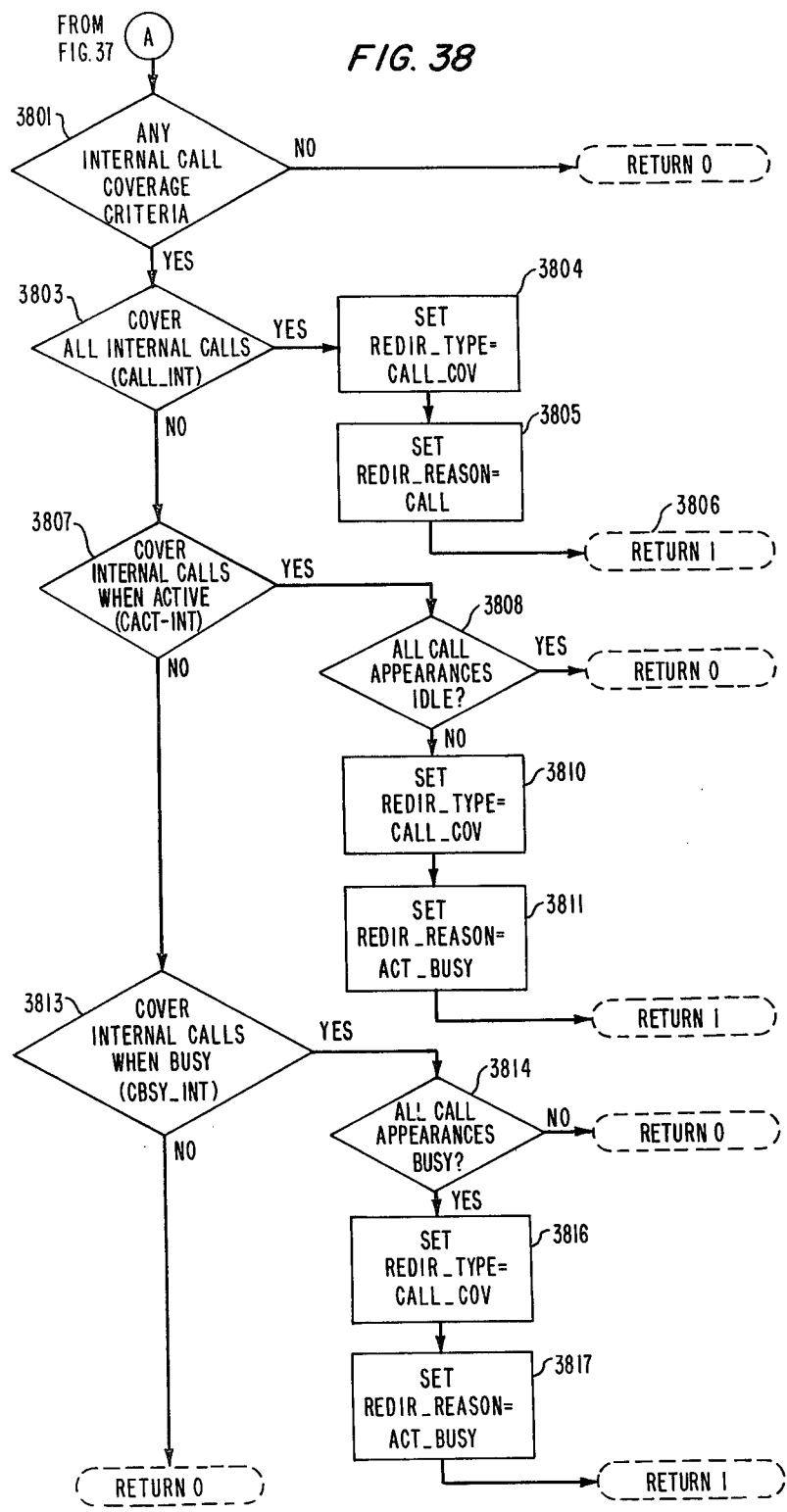
Figure 39:
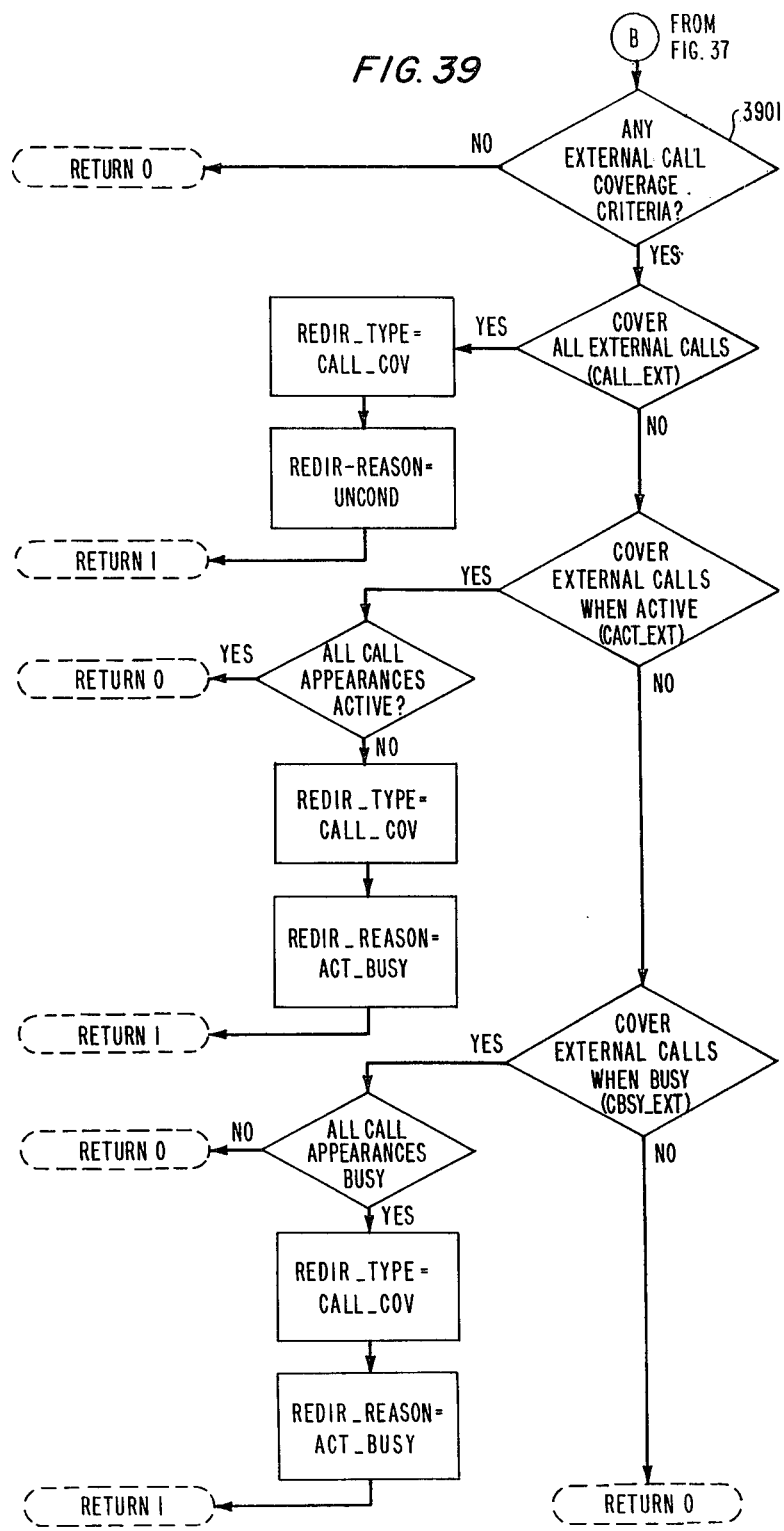

Subroutine CVR_CHK, shown in FIGS. 37, 38 and 39, returns a zero if the coverage criteria checked by the subroutine are not satisfied. If one criterion is satisfied, CVR_CHK returns a one. At decision 3702, it is determined from item REDIR_TYPE in trunk record TRKTBL6C (FIG. 5) whether the current call has previously been redirected to coverage. If so, CVR_CHK returns a zero to the calling program. Since the example call has not yet been redirected, the subroutine proceeds to decision 3704 which finds out from bit TOLL_BIT in table TRKTBL3 if the call is a priority call. If so, zero is returned. It is recalled that a priority call is one, such as a consult call, on which coverage is not allowed. The example call is not such a call, so at decision 3706 the subroutine determines if conventional call forwarding is active. This interrogation is made because conventional call forwarding is illustratively given preference over call coverage in the preferred embodiment. Since call forwarding is assumed to be not active at station 901, at decision 3708 subroutine CVR CHK checks bit SAC_STAT in table LSTWD1 (FIG. 6) to determine if SAC is active at station 901.

If SAC is active, step 3709 sets REDIR_TYPE to indicate that the call is being redirected because of coverage (as opposed, for example, to call forwarding) sets REDIR_REASON to SND_ALL at step 3710 to indicate that all calls to the station are being redirected, and CVR_CHK returns a 1 to the calling program. Since SAC is not active at station 901, the appropriate call coverage group (CCG) is fetched at step 3712 from table LXLN6 (FIG. 4).

If the principal station has no coverage group assigned to it, zero is returned to the calling program at step 3713. Since station 901 is assigned to CCG0, TL1 in TRKTBL4 (see FIG. 5) is interrogated at decision 3715 to determine whether or not the call is from an external station.

Since this call is internal, program execution continues at step 3801 in FIG. 38. If the call had been external, program execution would have continued at step 3901 in FIG. 39 where coverage criteria pertaining to external calls are tested.

Decision 3801 in FIG. 38 reads the four-bit item CVR_INT in COVRTBL0 (see FIG. 4). If the value of the item is 0, there are no internal call coverage criteria and CVR_CHK exits 0 at terminal 3802. Step 3801 determines that some internal call coverage criteria are present. Each of the internal criterion other than the "doesn't answer" criterion is tested individually in FIG. 38. In this example, decision 3803 determines that CALL_INT is set, meaning that all internal calls to station 901 are to be covered. Step 3804 therefore sets REDIR_TYPE to call coverage and step 3805 sets REDIR_REASON to cover all calls before CVR_CHK returns a 1 at terminal 3806.

Under other circumstances, other tests are made on coverage criteria for internal calls by subroutine CVR_CHK. If CALL_INT had not been set, bit CACT_INT would have been evaluated at decision 3807 to determine if coverage applies when the principal station is active on one or more call appearances. If so, step 3808 would determine whether all call appearances are idle. Bit CBSY_INT would have been checked at decision 3813 to determine if internal calls are to be covered when the principal station is busy (all call appearances active). In each of these last-mentioned tests, if a coverage criterion is satisfied, REDIR_TYPE is set to indicate call coverage and REDIR_REASON is set to reflect the criterion satisfied.

Calls from outside the system (external calls) are evaluated by the branch of CVR_CHK shown in FIG. 39. This branch is essentially identical to the one discussed above in FIG. 38 except that the external call criteria in item CVR_EXT of FIG. 4 are interrogated. Therefore, the steps of FIG. 39 are not discussed in detail.

Figure 14:
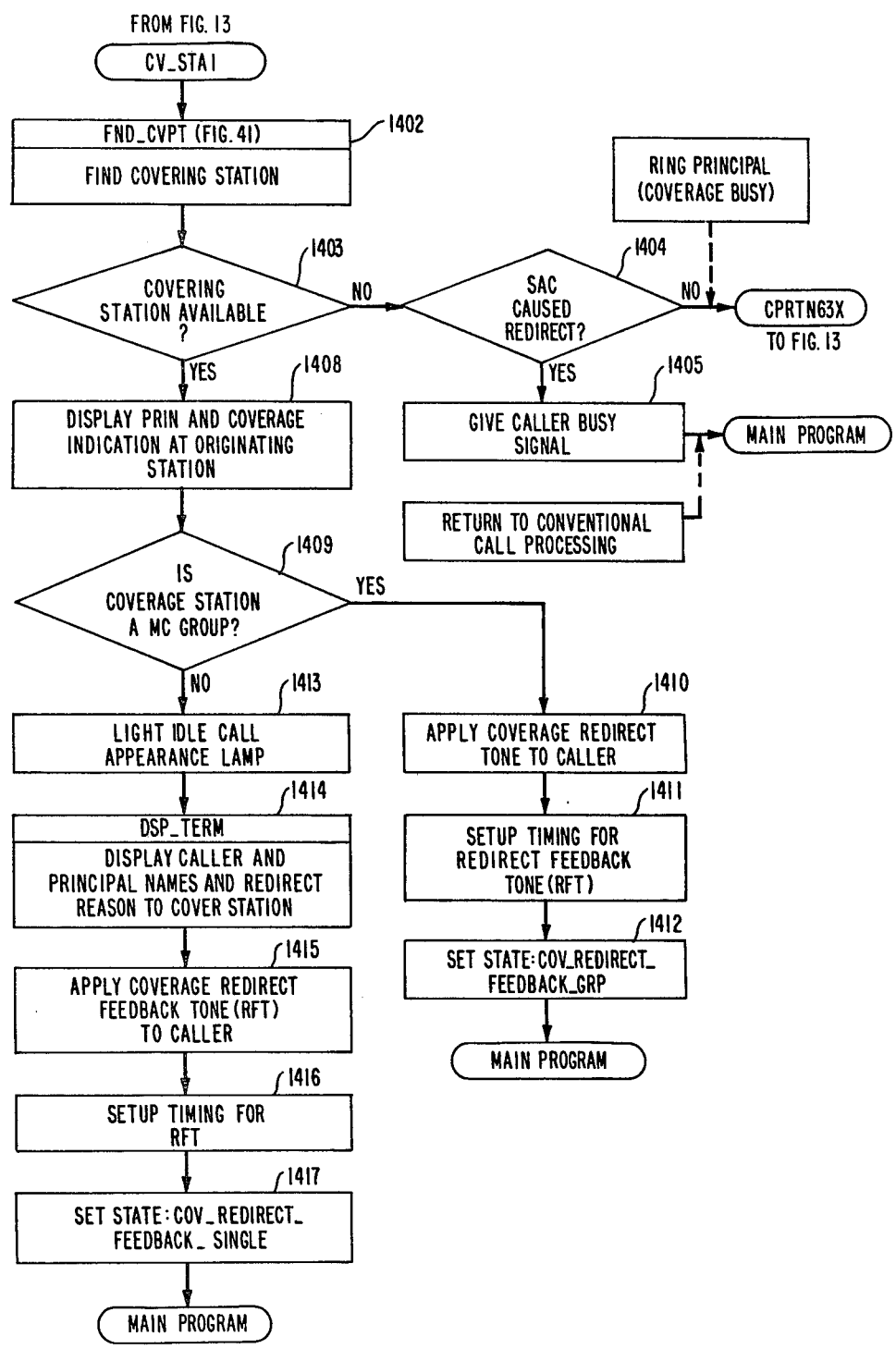

In the example call, subroutine CVR_CHK exited 1 at terminal 3806 to the calling program in FIG. 13. CVR_CHK also returns the CCG number 0 assigned to the principal station 901. Decision 1304 determines from the return 1 that some immediate coverage criterion are satisfied and transfers program control to CV_STA1 (FIG. 14).

CV_STA1 first executes at step 1402 the subroutine FND_CVPT (depicted in FIG. 41) to locate an available covering station, if any, for station 901.

Figure 41:
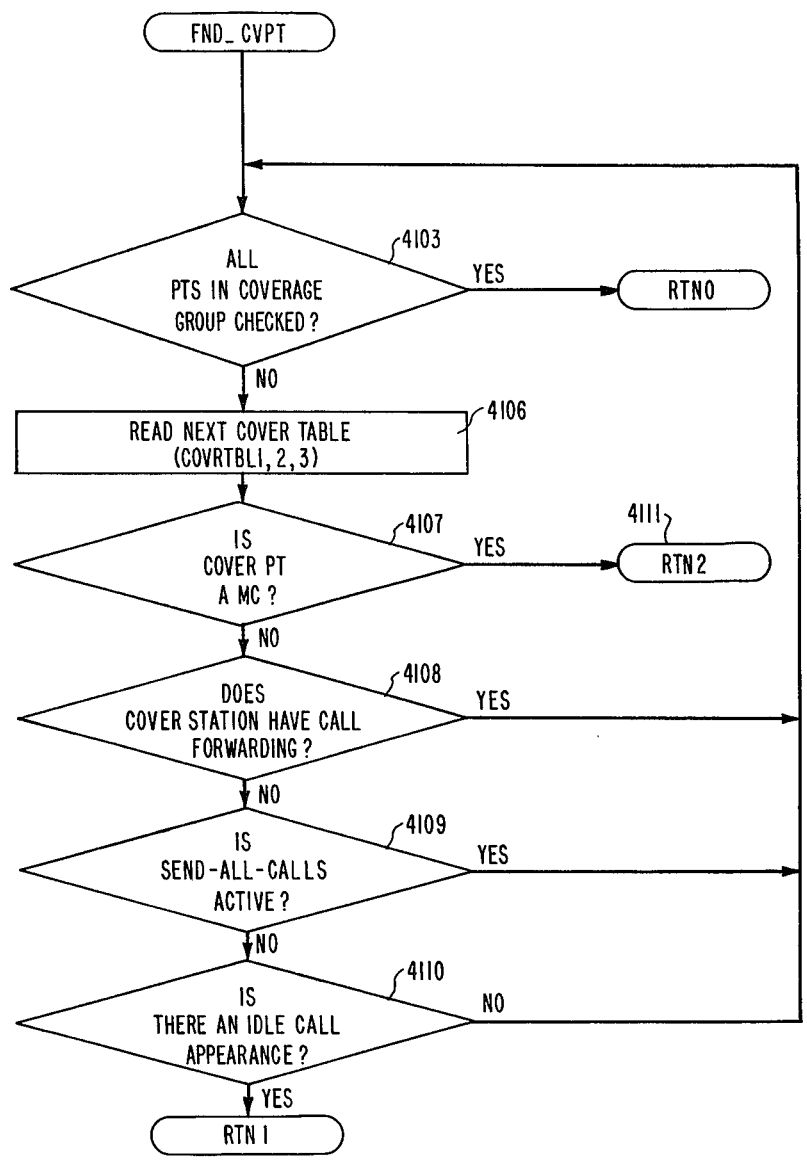

With reference to FIG. 41, FND_CVPT first sets up a loop in step 4103 to test in sequence the coverage tables COVRTBL1, COVRTBL2 and COVRTBL3 to locate an available covering station. Step 4106 reads the appropriate word, determined by the CCG number, of one of the cover tables COVRTBL1, 2 or 3 (see FIG. 4) as indicated by the loop. The first assigned covering station in COVRTBL1 is examined first. Group_flag GRPFLG1 of the read word is evaluated at decision 4107 to determine if the covering station is in a message center. The first covering station 902 for station 901 is not in a message center. Subroutine FND_CVPT therefore makes three checks to discover if the station is available to cover the call to the principal station. If the covering station has call forwarding or SAC set (decisions 4108, 4109) or if there is no idle call appearance at the station (4110), the station is considered unavailable and FND_CVPT repeats the loop to check the next cover station's status. It is recalled that for this example, it is assumed that covering station 902 is temporarily unattended. However, the SAC feature is inadvertently not activated for this covering station. The program therefore considers station 902 to be available and returns at step 4110 to the calling program at step 1403 with the number of an idle call appearance on station 902.

CV_STA1 progresses from decision 1403 to step 1408 which displays the name of the principal party and a coverage indication on the display module (if any) at the originating station 1001.

Since cover station 902 is not in a message center, step 1409 causes the execution of step 1413 where the idle call appearance on station 902 is seized and the associated lamp lit. Ringing of covering station 902 is not yet begun, however, until after expiration of the caller response interval (CRI) mentioned earlier and described below. Subroutine DSP_TERM (1414) (not shown in detail) is next called to display the caller and principal names and the reason for redirection taken from REDIR_REASON on the display module, if any, of covering station 902. At this point in the process, a redirect feedback tone (RFT) is applied to the calling station by step 1415 to alert the caller at station 1001 that the call is being redirected. Step 1416 establishes the timing of the RFT. Also at this point, step 1417 sets the COV_REDIRECT_FEEDBACK_SINGLE state in the PM1 item of the trunk record pertaining to this call. The main program is then entered to await timeout of the RFT interval.

Figure 15:
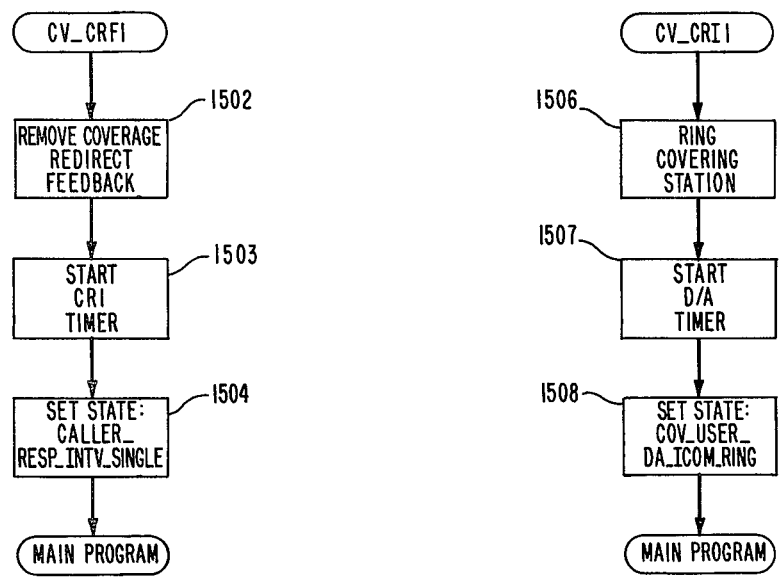

When the redirect feedback tone times out in the presence of the COV_REDIRECT_FEEDBACK_SINGLE state, routine CV_CRF1 in FIG. 15 is called.

The first step (1502) of CV_CRF1 removes the RFT. Another timed interval is now begun by step 1503 to measure the caller response interval (CRI). The length of the CRI is stored as a number (of two-second periods) in table CLR_RSP shown in FIG. 4. This interval allows time for the caller to take action if he does not wish to talk to a covering party. For example, the caller may abandon the call. The caller may wait out the CRI so the call can be covered at station 902. The caller may also activate LWC (to be subsequently described) which automatically leaves a message for the principal. The CRI is initiated by removing the RFT, the CALLER_RESP_INTV_SINGLE state is set by step 1504 and CV_CRF1 exits to the main program.

Assume for the example that the caller decides to wait out the CRI and allow the call to be covered. When the caller response interval times out in the presence of the CALLER_RESP_INTV_SINGLE state (as here) CV_CRI1 is entered from the main program (see FIG. 15).

Figure 17:
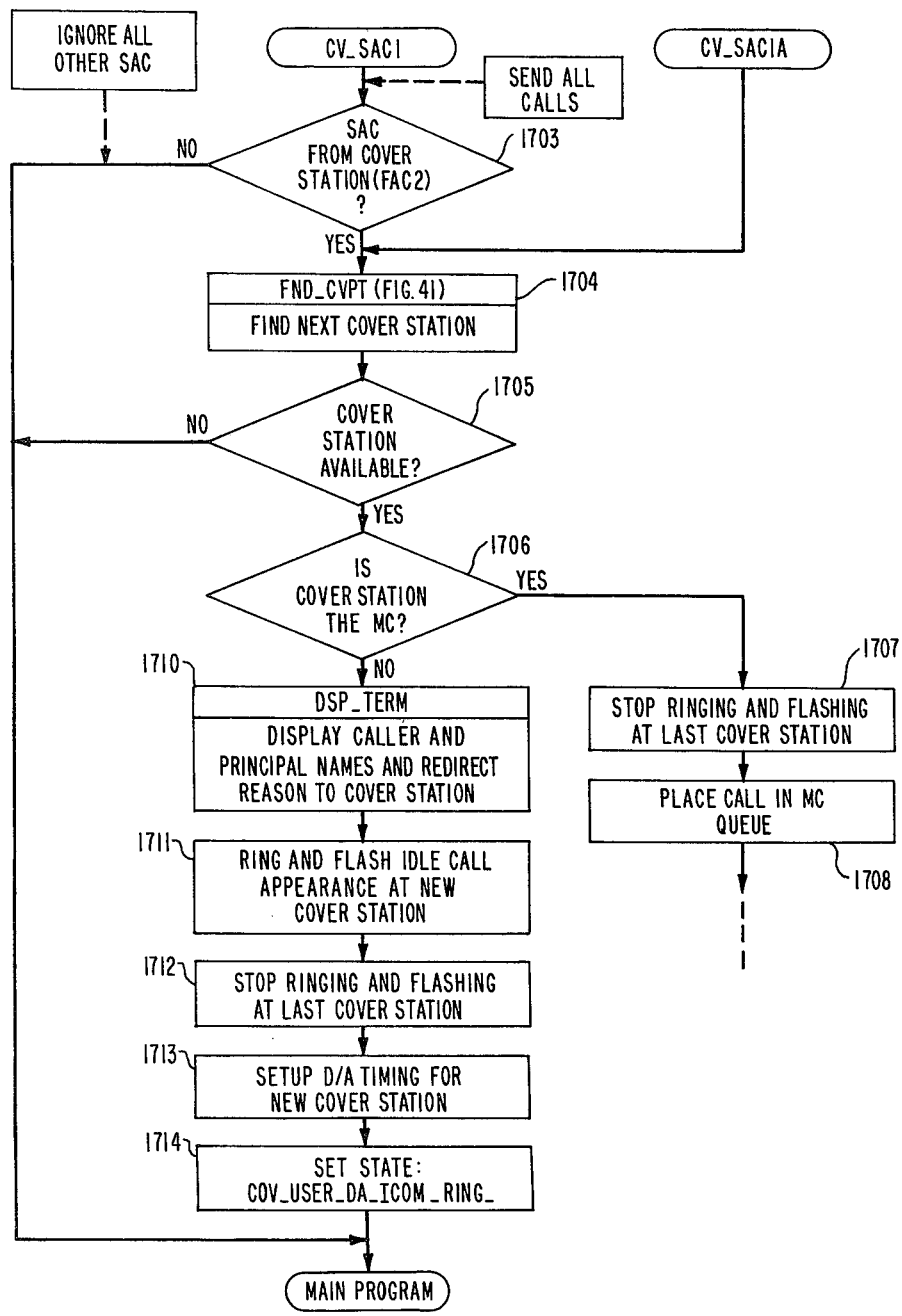

Step 1506 of CV_CRI1 begins the ringing of covering station 902. At this point, step 1507 starts a timer that establishes how long station 902 will be rung before the call is redirected again to the next covering station, if any. The amount of time allowed for a covering station to answer before the program checks for another cover station is stored as a number of two-second periods in table CVRRPTDA shown in FIG. 4. Step 1508 sets the COV_USER_DA_ICOM_RING state in PM1 and CV_CRI1 exits to the main program to await covering station answer or a timeout. The possible results of having set this state are shown in FIG. 12. Since it is assumed that covering station 902 is unattended, when the D/A timer runs out (state COV_USR_DA_ICOM_RING being set), routine CV_SAC1A in FIG. 17 is entered as shown in FIG. 12.

CV_SAC1A first executes subroutine FND_CVPT at step 1204 in FIG. 41. FND_CVPT continues the loop previously setup to find the next cover station. This is station 903 shown in FIG. 9 and item CVR_PT2 of table COVRTBL2 pertaining to CCG0. It is found at step 4109, however, that cover station 903 has SAC active as we assumed, so decision 4109 causes FND_CVPT to check table COVRTBL3 for another covering station. The final covering station for CCG0 is MC 104 as seen in COVRTBL3, so FND_CVPT returns a 2 at terminal 4111 to step 1705 of routine CV_SAC1A (FIG. 17). The 2 returned indicates that a covering point is available and that the covering station is in the message center. Since the covering station (104) is in message center 104 (decision 1706), call alerting is stopped at the last cover station 902 by step 1707, and the call is placed in a message center queue (not shown) by step 1708. Eventually the main program is entered. The queue is a conventional uniform call distribution queue. The call will be routed to the next available station in MC 104 as the final covering station by other system programs. No further details of MC call routing and operation are given here, however, as the details are not necessary for an understanding of the invention.

Had the next covering station been an individual station at step 1706, subroutine DSP_TERM (not shown) would have been called at step 1710 to display the calling and principal names and the principal station coverage criterion satisfied on the next covering station display. The call would be redirected to an idle call appearance on the covering station at step 1711. The call to the previous covering station is removed at step 1712. D/A timing for the redirected call to the next covering station is established at step 1713, and the call state is set to COV_USER_DA_ICOM_RING at step 1714 before exit is made to the main program.

D/A COVERAGE

Figure 40:
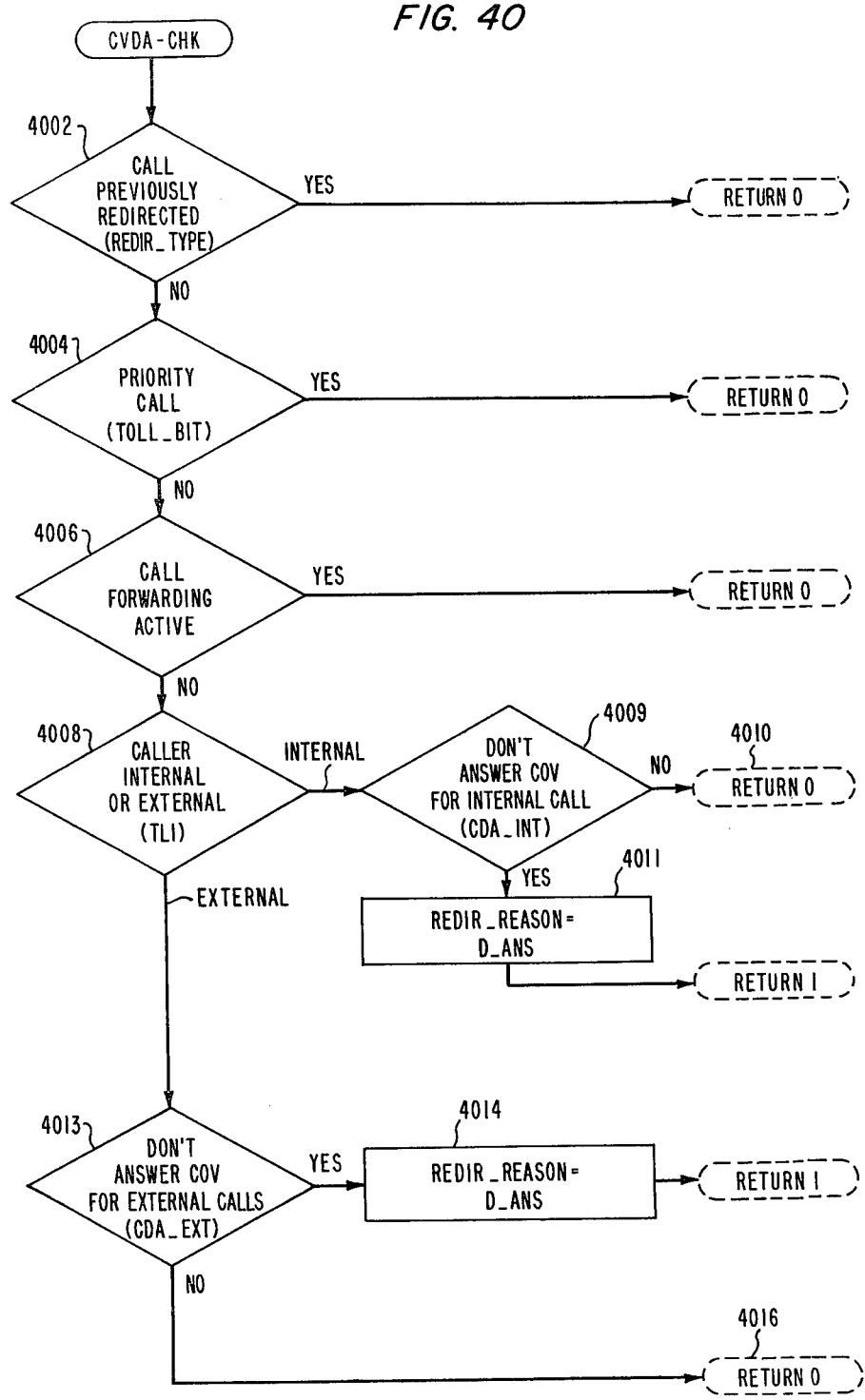

To understand the operation of the system when a principal station has selected a D/A coverage criterion, assume that an external call is made to station 902. Although station 902 is a covering station for certain principal stations as shown in FIGS. 9 and 10, in this example station 902 is called in its status as a principal station as shown in FIG. 11. With reference to table LXLN6 in FIG. 4 it is seen that station 902 is assigned to CCG2. In table CVRTBL0 it is seen that stations in CCG2 have D/A coverage on external calls (CDA_EXT=1). The call causes an entry to CPRTN63 in (FIG. 13) as before. If we assume that no coverage criterion, such as SAC, is initially satisfied that would cause an immediate redirection to coverage, the return from subroutine CVR_CHK at step 1303 causes the execution of step 1307 where it is determined if station 902 is busy. If it were, busy tone would be returned to the calling station in a conventional manner. Assume that station 902 is not busy. Appropriate information is displayed at the called station at step 1309 if a display set is present, and at step 1310 subroutine CVDA_CHK in FIG. 40 is executed to determine if D/A coverage applies to this call. With reference to FIG. 40, since this call has not been previously redirected and since it is not a priority call and assuming call forwarding is not active at station 902, step 4008 is executed to determine if the call is from an internal or external station. Since the call is external, step 4013 interrogates the external D/A coverage flag (CDA_EXT) in table COVRTBL0. Since this flag is set, item REDIR_REASON is set to D/A and return is made at 4016 to the calling program. This return causes step 1311 to execute step 1312 where a D/A timing period is set up. The length of this period is taken from PRINC_DA_INTV in table COVRTBL0 which contains the number of two second intervals in which to ring the principal station before redirection to coverage is initiated. The call state is set to PRINC_DA_ICOM_RING at step 1313 and the main program is entered with station 902 ringing.

Figure 18:
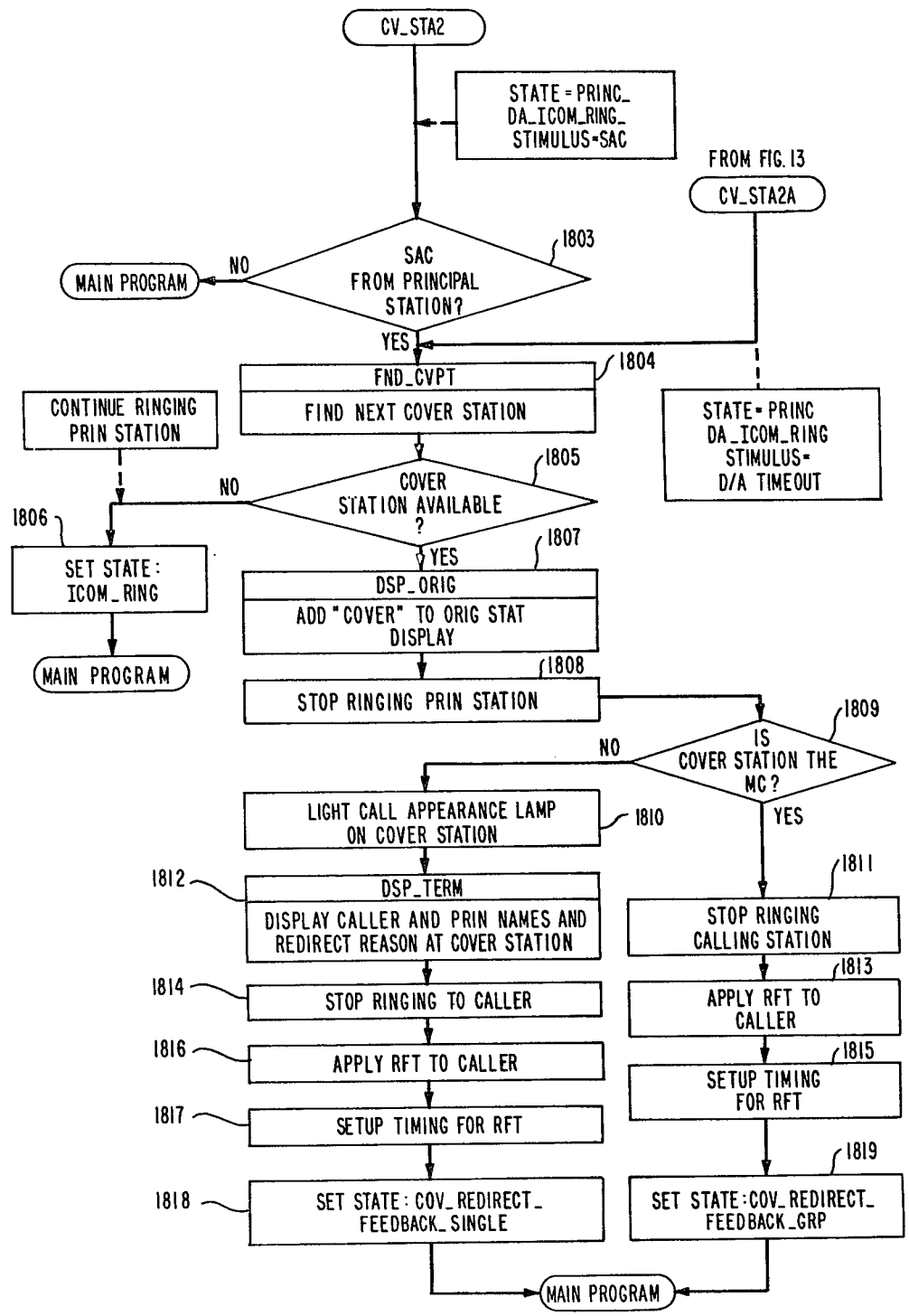

If the D/A timing interval expires, entry is made to CV_STA2A in FIG. 18, as shown in FIG. 12. At CV_STA2A, the program initiates the redirection of the call to the respective coverage path for CCG2. The next covering station, if any, is found at steps 1804 and 1805. If no covering station is available, ringing is continued at the principal station and the call state is placed in ICOM_RING at step 1806.

Subroutine DSP_ORIG (not shown) adds the word "cover" at step 1807 on the calling station display, if any, if a covering station is available. The call is removed from the principal station at step 1808. If the covering station is an individual station, an idle call appearance on the station is seized and the associated lamp lit at step 1810. The names of the called and the principal are displayed to the covering station at step 1812. Preparation is now made to begin the CRI. Ringing is stopped at the calling station at step 1814 and RFT is applied at step 1816. Timing to measure the length of the RFT is setup at step 1817 and the call state is set to COV_REDIRECT_FEEDBACK_SINGLE at step 1808 before exiting to the main program. When the RFT timing expired, CU_CRFI in FIG. 15 is entered and program operation continues there, as already described.

If the next covering station is in a MC as determined at step 1809, RFT is initiated at steps 1811, 1813 and 1815 and the call state is set to the appropriate state for redirection to a MC at step 1819. In this case, appropriate program operations are performed upon expiration of the RFT that pertain to MC redirection. These operations are not discussed further as they are unnecessary to an understanding of the invention.

SEND-ALL-CALLS

To illustrate the SAC feature, assume that a call is made from calling station 901 to station 1001. Station 1001 is idle, but the principal is in conference. Station 1001 rings, and the principal presses the SAC button to dispose of the call without answering it. The call is redirected to covering station 902 where it is answered.

Routine CPRTN63 in FIG. 13 is entered on the original call as before. CVR_CHK (FIGS. 37, 38) checks the coverage criteria for immediate redirection but station 1001, which is assigned to CCG1, has no immediate criterion which is satisfied. It is determined at decision 1307 whether there is an idle call appearance at the principal station 1001. Since station 1001 has an idle appearance, at step 1309 the caller is identified on the display of principal station 1001 (if any), and the principal is identified on the calling station's display. Subroutine CVDA_CHK in FIG. 40 is called to determine if station 1001 has D/A coverage. Bit CDA_INT of table COVRTBL0 (in FIG. 4) is tested at decision 4009 in CVDA_CHK. FIG. 4 shows that station 1001 does not have D/A coverage on internal call, so routine CVDA_CHK returns 0 to routine CPRTN63 at terminal 4010. As a result, the ICOM_RING state is set at step 1315 in the calling program and the main program is entered. The principal station is rung in the ICOM_RING state as shown in FIG. 12. It is assumed that the principal at station 1001 declines the call by pressing the SAC button.

Figure 19:
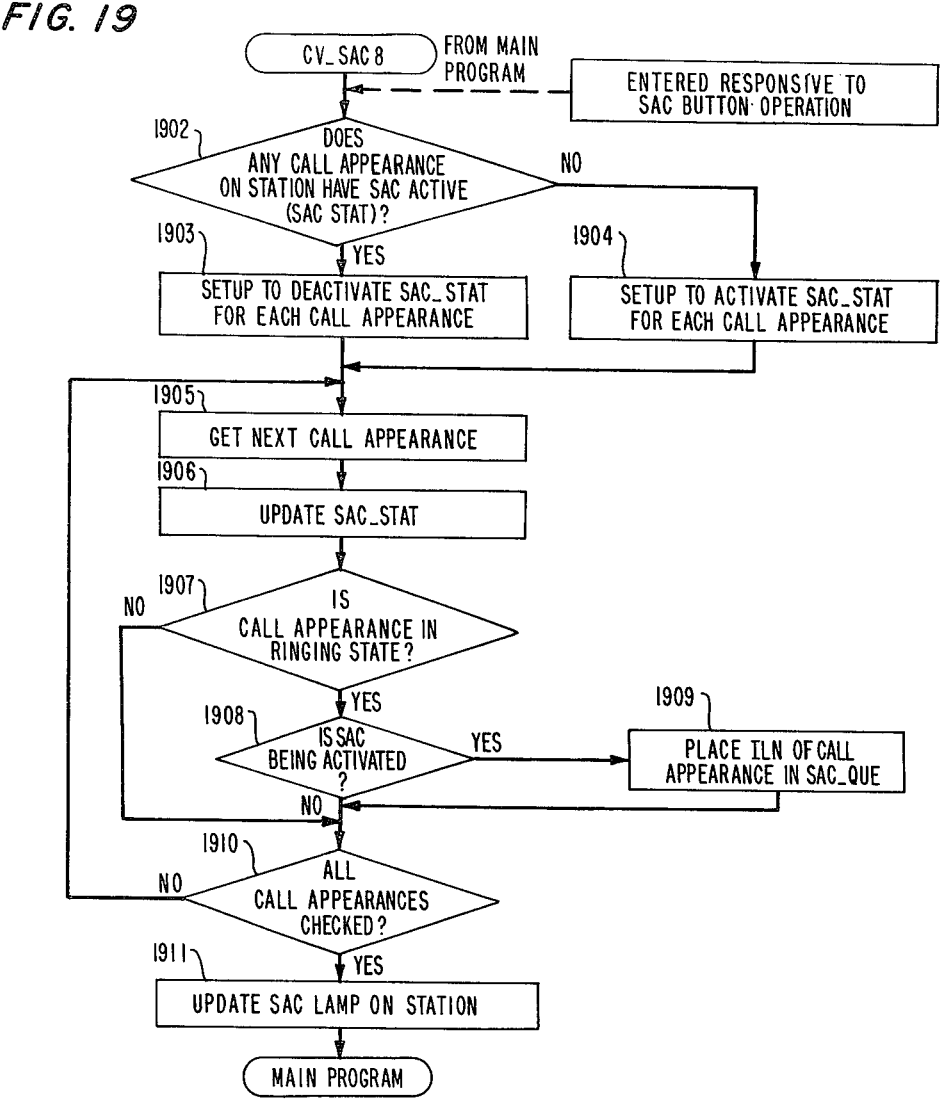

CV_SAC8 (see FIG. 19) is entered whenever a SAC button is pressed. It updates the SAC memory status of the activating station and initiates the generation of a SAC stimulus for any call in the ringing phase at the activating station. The routine either sets or clears SAC_STAT in table LSTWD1 (FIG. 4) for all call appearances on the activating stations, depending on the previous SAC state. If SAC is active for any call appearance (SAC_STAT=1), CV_SAC8 will clear SAC_STAT on all call appearances. Otherwise, the program sets SAC_STAT on all appearances.

Responsive to the SAC operation at station 1001, CV_SAC8 determines at step 1902 if any call appearance on the station 1001 has SAC active. Assuming that none are, step 1904 prepares the program to activate SAC status for each call appearance, as opposed to deactivation which would occur at step 1903 otherwise. Step 1905 finds the next (or first) call appearance to be updated and step 1906 updates the appropriate SAC_STAT flag. At decision 1907 it is determined whether the call appearance just updated is in the ringing phase. Assuming that this is the calling appearance on which the call is arriving at station 1001, step 1908 determines if SAC is being activated. Since we assume that SAC is being activated, step 1909 places the ILN of the call appearance on station 1001 in table SAC_QUE (FIG. 6) to initiate the generation of a SAC stimulus. Decision 1910 causes the updating process to be repeated for each remaining call appearance. The SAC lamp on station 1001 lit in this example at step 1911.

Figure 20:
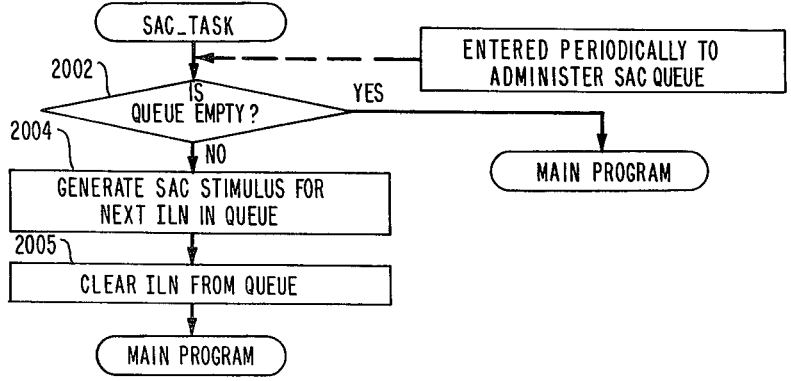

Every few milliseconds, the $SAC_{14}$ TASK routine in FIG. 20 is run to administer ILN entries in the SAC_QUE table and, to generate the SAC stimulus for each ILN entry. On the next entry to SAC_TASK after the station 1001 ILN was stored in SAC_QUE by CV_SAC8, steps 2002 and 2004 generate a SAC call processing stimulus for the call ringing at station 1001 and clears the ILN from the queue step 2005 before exiting to the main program. The SAC stimulus causes a subsequent entry to CV_SAC3 (see FIG. 13) as shown in FIG. 12. CV_SAC3 first determines at step 1318 if the SAC activation was from the principal station 1001 or inadvertently from the calling station. If from the calling station, it is ignored. Since the principal pressed the SAC button and the call is not a priority call (decision 1319—in which case the stimulus is ignored), and the call has not been redirected to coverage (step 1320 —in which case a principal activated SAC is superfluous), routine CV_STA2A is entered in FIG. 18 to act on the stimulus. CV_STA2A redirects the call to coverage in the same manner as already described.

The call is redirected to the first covering station 902, if available, after expiration of the CRI.

SEND-ALL-CALLS DURING CALLER RESPONSE INTERVAL

It is possible that the coverage station 902 may activate the SAC feature at the covering station during the CRI interval. The covering party is aware of the scheduled call redirection by a seizure of an idle call appearance before the CRI is initiated. The call is in state CALLER_RESP_INTV_SINGLE during this interval. As shown in FIG. 12, receipt of a SAC stimulus during this state causes an entry to program CV_SAC2 in FIG. 15. It is also possible that SAC is inadvertently operated at calling station 1001. Step 1602 determines which station activated the SAC. If it came from the calling station, the stimulus is ignored. If the stimulus is from the covering station, this means that the covering party recognizes that a call to be covered will arrive shortly after expiration of the CRI and for any given reason the covering party does not wish to answer it. The SAC stimulus in this case causes the call to be routed to the next covering station, if any, in the coverage path. To accomplish this, subroutine FND_CVPT is called at step 1604 to find the next covering station, if any. If there is none or if the remaining covering stations are unavailable the SAC request is ignored. If a covering station is available (step 1605), step 1603 removes the seizure of the idle call appearance at the covering station and any display that may have been given. If the next covering station is in MC 104 (step 1606) the call state is set to CALLER_RESP_INTV_GRP at step 1609 to reflect that the call is being redirected to an MC group and return is made to the main program to continue the CRI. If the next covering station is an individual station, step 1607 seizes an idle call appearance on the station, initializes the display module, if any, and returns to the main program to continue the CRI.

SEND-ALL-CALLS DURING COVERAGE RINGING

It is also possible that a SAC stimulus is received during the ringing of the redirected call at covering station 902 (or any other covering station). This stimulus causes an entry to program CV_SAC1 in FIG. 17. The program determines at step 1703 that the SAC stimulus was received from the cover station by interrogating item FAC2 in the trunk record. If the stimulus is from the calling or principal station, the stimulus is ignored. If the stimulus is from the covering station, the program proceeds to redirect the call to the next covering station in the appropriate coverage path in the remaining steps of FIG. 17 which have already been described.

SEND-ALL-CALLS DURING PRINCIPAL D/A TIMING

In the prior example of D/A coverage in which an external call was assumed to be placed to station 902, it is recalled that D/A timing was set up at step 1312 and ringing of the principal station begun. Assume now that the SAC feature is activated at the principal station while ringing is occurring during the D/A timing interval. The SAC activation causes a SAC stimulus to be generated as described above. The call state is PRINC_DA_ICOM_RING. The stimulus causes an entry to CV_STA2 in FIG. 18, as shown in FIG. 12. At step 1803, CV_STA2 verifies that the SAC activation came from the principal station. Otherwise, it is ignored. If the activation was at the principal station, the program then proceeds to redirect the call to coverage as already described.

IMPLIED PRINCIPAL ADDRESSING - CONSULT CALL

To illustrate one example of implied principal addressing, assume now that the prior call redirected to covering station 902 is answered at that station. Assume too, that the call for the principal is important enough to justify interrupting the conference in which the principal is engaged. The covering party therefore wishes to inform the principal at station 1001 by means of a consult call to answer the original call. The principal has the ability to answer the call due to a simulated bridged appearance (SBA) maintained at the principal station in the illustrative system on the calling appearance on which the call originally arrived. The SBA is not necessary for an understanding of implied principal addressing and is not discussed further.

Figure 21:
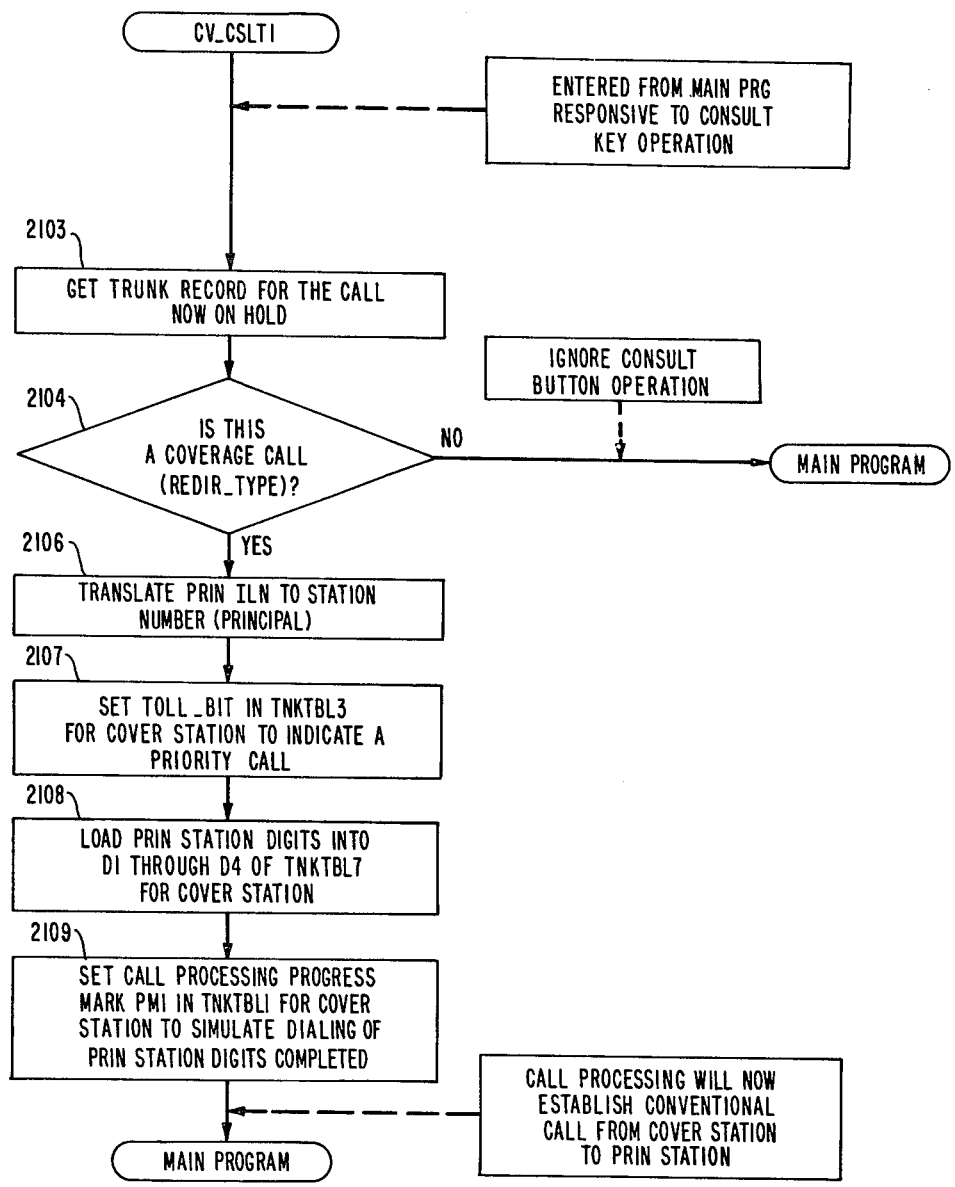

The covering party at station 902 puts the covered call on hold by operating the conference button 313 or the transfer button 312, which also automatically selects an idle call appearance on the covering station, and then operates the consult button 311. The system enters routine CV_CSLT1 in FIG. 21 as a result of the consult button operation. The covering station index is given to CV_CSLT1 as an input parameter. At step 2103, CV_CSLT1 obtains the ILN of the appearance on hold to get the trunk record for the covered call. This is accomplished by using the station index to get the button identification of the held select button from CXF_LN in table EKT_STA2. The button identification is then translated to the held appearance ILN. CXF_LN is loaded with the button identification by a conventional program (not shown) that administers button operations. Item REDIR_TYPE of TRKTBL6C is tested at step 2104 to verify that the held call at the activating station is a coverage call. Otherwise, the button operation is ignored. CV_CSLT1 next proceeds to step 2106 where the principal station 1001 ILN is retrieved from TRKTBL6B of the trunk record for the covered call (see FIG. 5) to automatically identify the principal station associated with the currently held call appearance on the covering station for implied principal addressing. The ILN is translated to the principal directory station number for use in establishing a call from covering station 902 to principal station 1001. At step 2107, item TOLL_BIT is set in TRKTBL3 (FIG. 5) for the consult call to indicate a priority call. The principal directory station number is loaded into items D1 through D4 of TRKTBL7 (also in FIG. 5) at step 2108. Finally, the call progress mark PM1 is set for the consult call in TRKTBL1 (FIG. 5) to a prescribed state at step 2109 to simulate completed dialing of the principal's directory number. CV_CSLT1 then exits to the main program. The dialing completed state mark just placed in PM1 and the principal station digits loaded into the trunk record simulates the dialing of a call from the covering station to the principal station and causes the main program to establish the necessary call connections. CPRTN63 in FIG. 13 is entered in response to the consult call by the main program to determine if call coverage is applicable to this call. Because TOLL_BIT was set in step 2107, step 3704 in subroutine CVR_CHK, called by CPRTN63, avoids the possibility of attempting to redirect the consult call to coverage. The principal station is rung with a special priority alerting signal (not discussed) to inform the principal of the priority call, regardless of his coverage and SAC status. After the principal answers the consult call, the covering party at station 902 may automatically connect the principal station and calling stations by operating the transfer key, or the covering party may automatically form a 3-way conference with the calling and principal stations by operating the conference key.

LEAVE WORD CALLING AND COVERAGE CALLBACK

In the following examples demonstrating LWC, it is understood that the feature may be activated from any answering station, such as in call pickup and call forwarding, as well as from a covering station as disclosed earlier in this specification.

Figure 26:
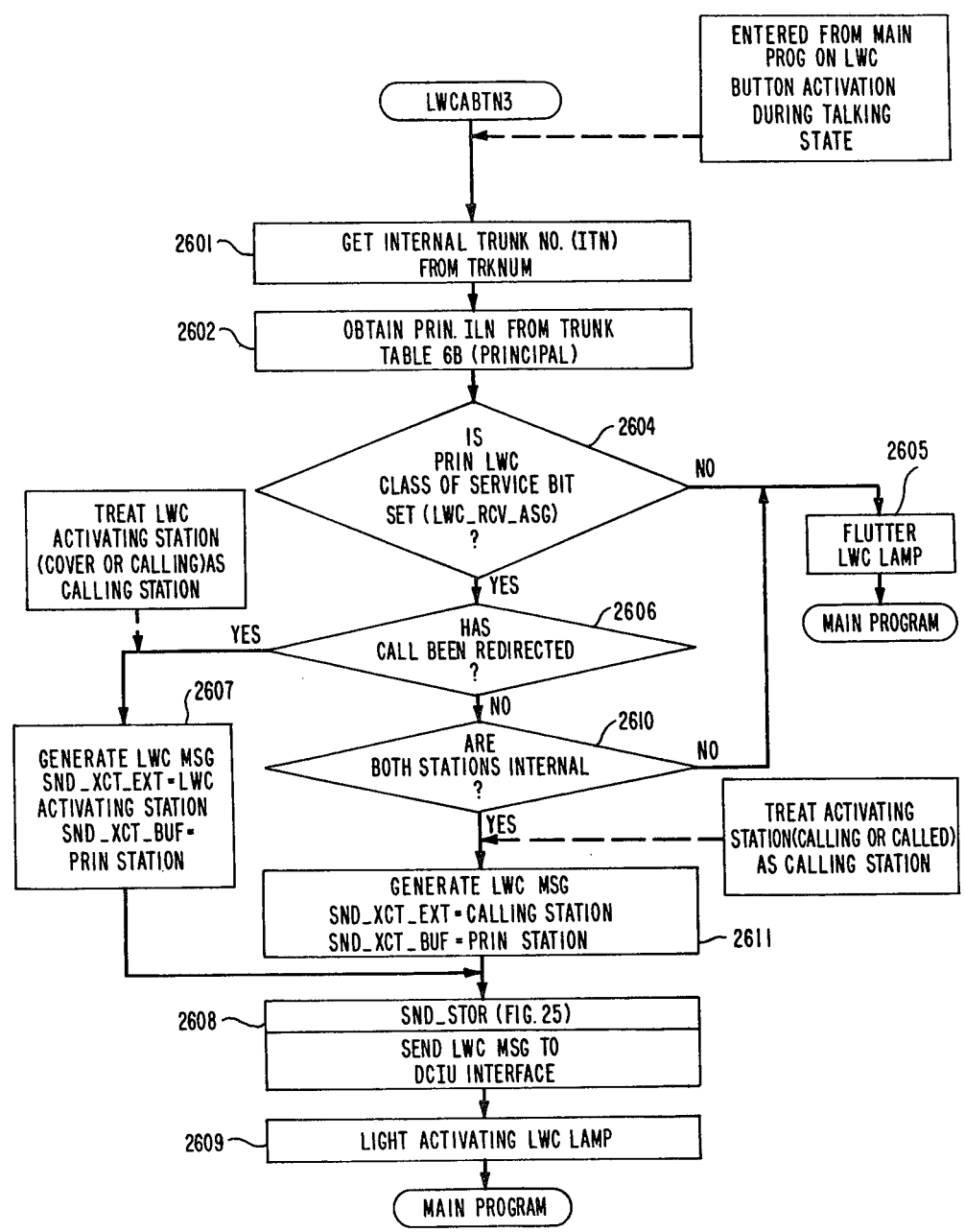

Assume now that the caller at station 1001 calls station 901. The call is redirected to coverage because 901 has cover all calls external and internal criteria. The call is answered at covering station 902. Further assume that the calling party wishes to leave a message for the principal at station 901 other than a simple callback request. The message might be, for example, "The Acme contract is going to be cancelled if we don't deliver this week". This message is manually taken by the covering party at station 902. The covering party now wishes to request the principal at station 901 to call to retrieve the message. To do so, the covering party operates the LWC button on station 902. This button operation is detected by the system and entry is made to LWCABTN1 in FIG. 22 with the activating station index as an input parameter. This program translates the station index at step 2200 to the appropriate ILN depending on the selected call appearance at the covering station. At step 2201, the program determines if an LWC message has already been stored on this call by interrogating item LWC_ACT_ON. A second LWC message request will not be honored on any given call and in this case the program exits at 2202 to the main program. Assuming that LWC_ACT_ON has not been set, the program determines if covering station 902 is authorized to activate LWC messages. It does this at step 2203 by interrogating item LWC_SND_ASG in the LCOST4 table (FIG. 4). If an activating station is unauthorized to activate LWC messages, the LWC lamp associated with the LWC button at the station is fluttered at step 2204 and the request is ignored. Assuming that station 902 is authorized to activate LWC messages, the program determines at step 2205 if a call record has been created on this call. A call always exists unless the calling party is receiving busy tone. An LWC call processing stimulus is generated at step 2206 and exit is made to the main program at 2207. Depending on the state of the call in PM1 of trunk table 1, an LWC stimulus causes a subsequent entry to program LWCABTN2 in FIG. 23 if LWC is activated during a caller response interval (CRI) or during a ringing state, and an entry to LWCABTN3 (FIG. 26) if activation occurs during a talking state. The stimulus causes an entry to LWCACT1 (FIG. 27) if the LWC feature is activated before a principal station is dialed.

Figure 25:
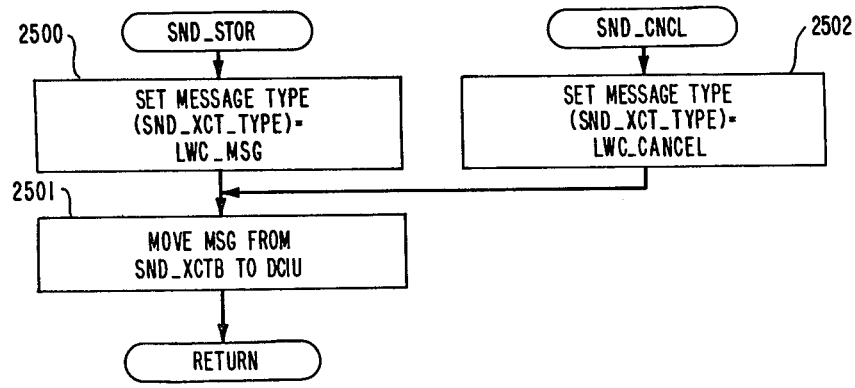

In the example at hand, calling station 1001 and covering station 902 are in talking states at the time of the LWC activation at station 902. The generation of an LWC stimulus at step 2206 therefore causes a subsequent entry to program LWCABTN3 in FIG. 26. The program obtains the internal trunk number (ITN) for this call from item TRKNUM in the line status table LSTWD1 (FIG. 6) at step 2601. The principal station 901 is identified for implied principal addressing by obtaining the principal station ILN from trunk table 6B at step 2602. If item LWC_RCV_ASG shows that the principal station 901 is not allowed to receive LWC messages (step 2604), the program flutters the LWC lamp on the activating station 902 at step 2605 and exits to the main program. If the principal station 901 is allowed to receive LWC messages, the program determines if this call is a redirected call by interrogating item REDIR_TYPE from trunk table 6C at step 2606. The purpose of this step is to determine whether to treat calling station 1001 or covering station 902 as the calling station for purposes of the LWC message to be generated. In this example, since covering station 902 activated the LWC feature, the program at step 2607 generates the LWC message treating covering station 902 as the calling station by storing the station 902 number in SND_XCT_EXT. The ILNs of both the activating station and the principal station are translated to station directory numbers for message storage. At step 2608, subroutine SND_STOR is called to send the LWC message to the DCIU interface program. SND_S-TOR is shown in FIG. 25. This routine stores LWC messages in a buffer area which the DCIU interface (program not shown) unloads for transmittal to AP 103. At step 2500, SND_STOR first sets a message type item SND_XCT_TYPE in message sending block SND_XCTB (FIG. 7) to indicate the storage of an LWC message. At step 2501, the subroutine moves the contents of SND_XCTB into the DCIU for transmittal to the AP. The subroutine then returns to the calling program at step 2609 of FIG. 26. The LWC lamp on the activating station 902 is lit at 2609 and the program exits to the main program after completing the generation and storage of the LWC message.

Assume for the moment that at step 2606 it was determined that the call had not been redirected to coverage. This might occur, for example, when a party other than the desired principal answers the principal station. The calling party (or the answering party) might activate the LWC feature in this case rather than have the answering party take a manual message for the principal party. In this case, it is first verified at step 2610 that both the calling and principal stations are internal stations. Otherwise, an LWC message will not be generated. If both stations are internal, the program at step 2611 generates the LWC message by storing the calling station 1001 number in SND_XCT_EXT and the principal station 901 number in SND_XCT_BUF.

Figure 22:
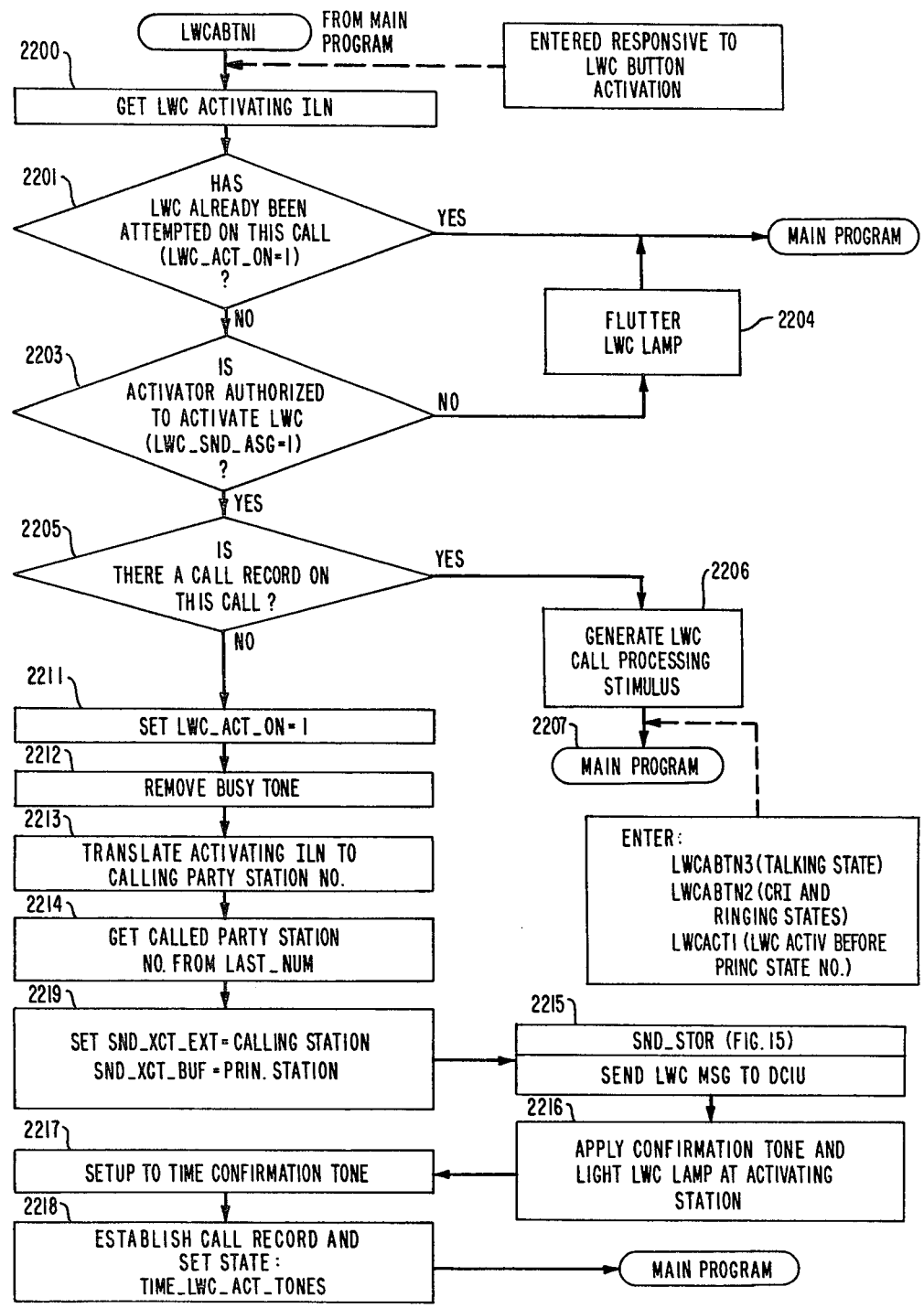
FIGS. 22 through 29 show similar flowcharts pertaining to LWC and CC message processing.
Figure 23:
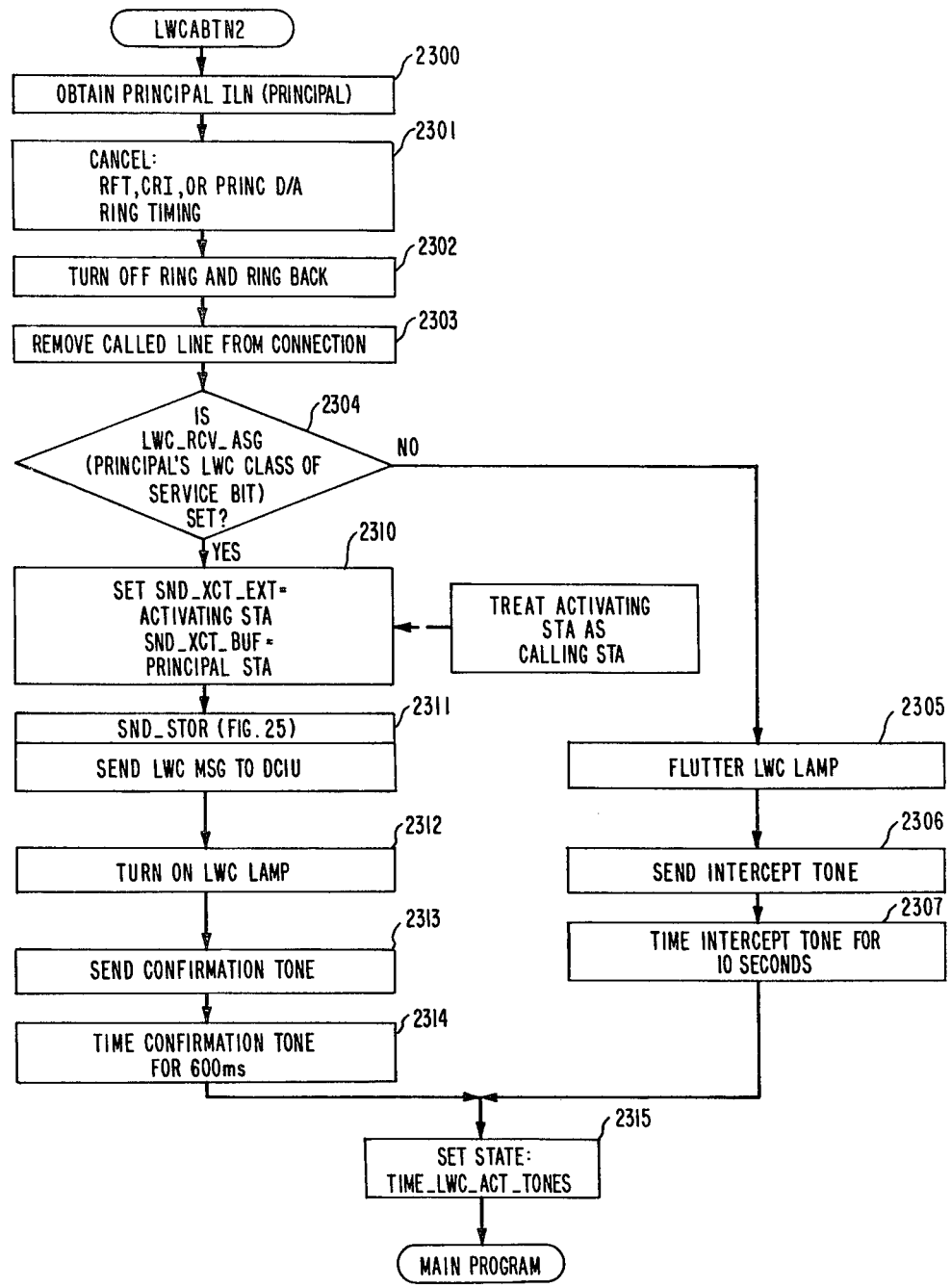
Figure 24:
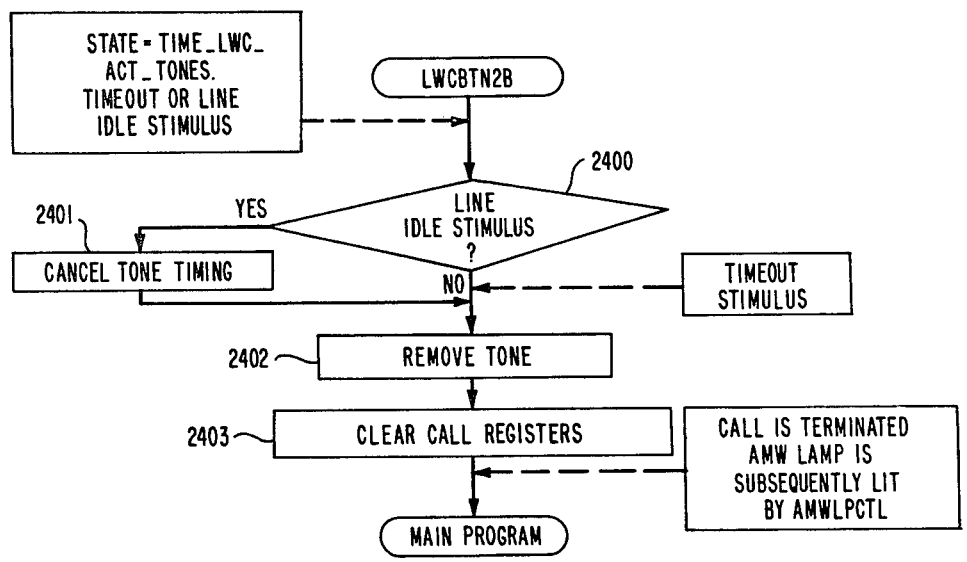

If when the LWC button activation is first received in FIG. 22, it is assumed at step 2205 that there is no call record (calling party receiving busy tone) the program sets LWC_ACT_ON at 2211 to indicate that an LWC message is being stored. Busy tone to station 902 is removed at 2212. The ILN of activating station 902 is translated to the calling station number at step 2213. The number of called station 901 is obtained at step 2214 from item LAST$_{14}$ NUM in table EKT_STA2. These station identities are stored at step 2219 for transmittal to the applications processor by subroutine SND_S-TOR at step 2215. At this point, the program generates a confirmation tone to the LWC activating station 902 and lights the LWC lamp at step 2216. At step 2217, the program initiates a timing interval to time the duration of the confirmation tone. It creates a call record for this call and sets the call progress mark PM1 to state TIME_LWC_ACT_TONES at step 2218 and exits to the main program. A timeout of the confirmation tone interval causes a subsequent entry to program LWCBTN2B in FIG. 24. The receipt of a line idle stimulus, while in the above call state, meaning that some line in this connection went on-hook, also causes an entry to LWCBTN2B. The program first determines at step 2400 which of these stimuli caused the entry. If a line idle stimulus was received the program cancels the tone timing at step 2401. In either case tone is removed at step 2402 and all call registers associated with this call are cleared at step 2403. The LWC function is now complete and exit is made to the main program.

Figure 30:
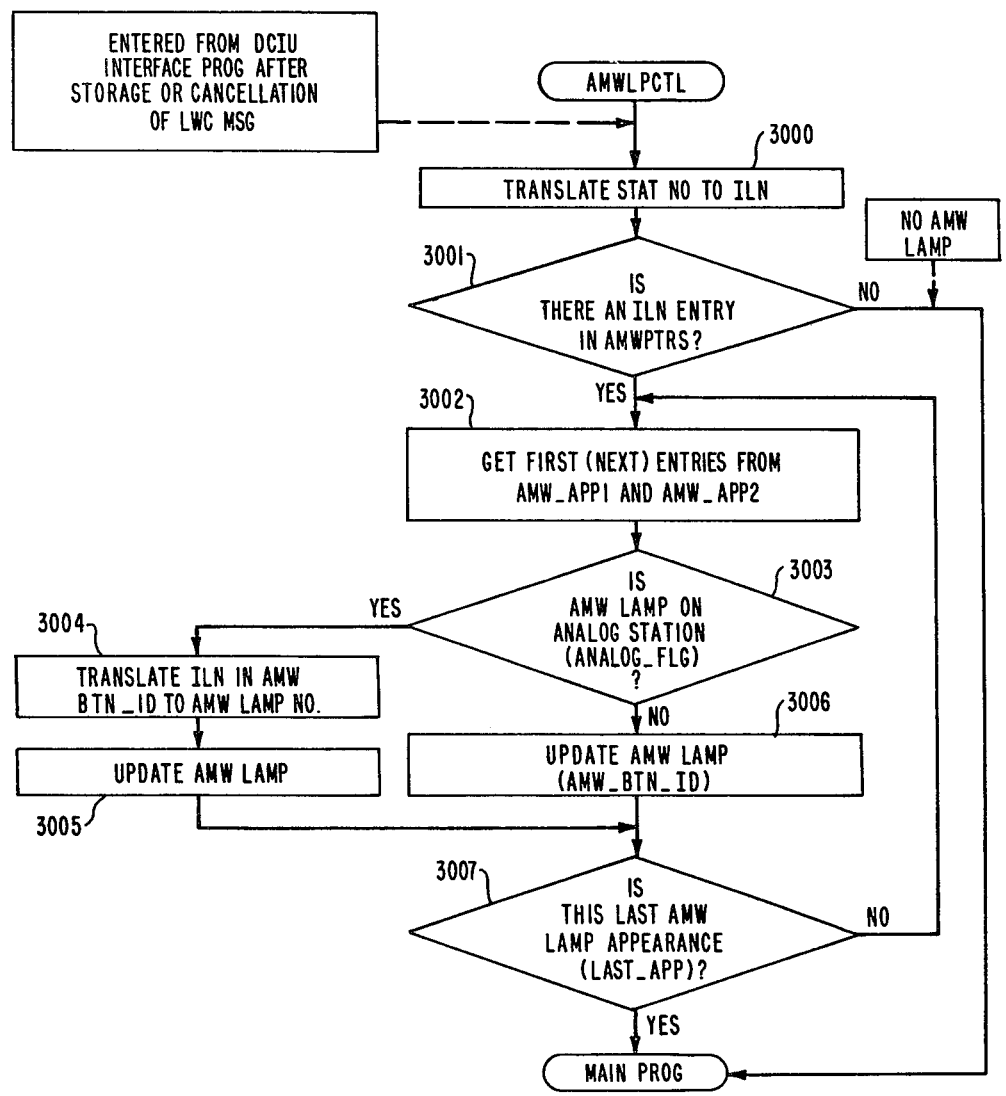
FIG. 30 shows the program flowchart used for updating the on/off status of automatic message waiting lamps on stations in response to the storing of messages for principal stations.

In each of the examples above resulting in the successful storing of an LWC message, the automatic message waiting (AMW) lamp associated with the principal station 901 and any extensions of that AMW lamp will be automatically lit subsequently in response to a message from AP 103 causing an entry to program AMWLPCTL in FIG. 30. When AMWLPCTL is entered, it is given the station number 901 whose AMW lamp is to be updated. This is translated to the ILN at step 3000. At step 3001, the program determines if there is an entry for this ILN in table AMWPTRS. If so, item LAMPTR is read from the table to obtain the appropriate address pointer into tables AMW_APP1 and AMW_APP2. The first or next entry from each of these tables is obtained at step 3002. If item AMW_S-TA_NUM from AMW_APP1 indicates that station 901 is not a multifunction station as determined at step 3003, the program next translates the ILN from item AMW_BTN_ID in table AMW_APP2 and uses this information to light the appropriate AMW lamp. These actions occur at steps 3004 and 3005. On the other hand, if the AMW lamp is located on a multifunction station, the program lights the appropriate lamp using the identification number obtained from item AMW_BTN_ID from table AMW_APP2. This occurs at step 3006. At step 3007 the program interrogates flag LAST_APP from table AMW_APP2 to determine if this is the last message waiting lamp entry to be updated. It repeats the foregoing steps if there is another lamp entry and exits to the main program otherwise.

Assume now that LWC is activated by the caller at station 1001 during a caller response interval (CRI) or during ringing of covering station 902 (or any station). The LWC stimulus generated at step 2206 causes a subsequent entry to program LWCABTN2 in FIG. 23. In this case an LWC message is generated, if authorized, and the call terminated. LWCABTN2 obtains at step 2300 the ILN of the principal station 901 by translating the activating station index as before. At step 2301 it cancels the redirect feedback tone (RFT) if applicable, and the CRI or principal D/A timing. Next, it turns off ringing and ringback signals to the appropriate stations at step 2302. It removes the called station connection at step 2303, and then determines at step 2304 from item LWC_RCV_ASG if the principal station 901 is authorized to receive LWC messages. If not, the program alerts the activating station 1001 of the failure to generate the message by fluttering its LWC lamp and by sending intercept tone at steps 2305 and 2306. It sets up to time the intercept tone for an illustrative 10 seconds at 2307. Assuming, however, that station 901 is authorized for LWC messages, the program stores the calling station 1001 and the principal station 901 numbers in message sending block SND_XCTB at step 2310. The message is sent to the DCIU interface program at step 2311. The LWC lamp on station 1001 is turned on at step 2312. Confirmation tone is sent to station 1001 at 2313 and timing for the confirmation tone is set up at step 2314. Finally, the call processing state is set to TIME_LWC_ACT_TONES at step 2315 and the main program is entered while tone is being applied to the calling station 1001. Entry is made to LWCBTN2B (FIG. 24) after expiration of the tone interval as already described.

Figure 27:
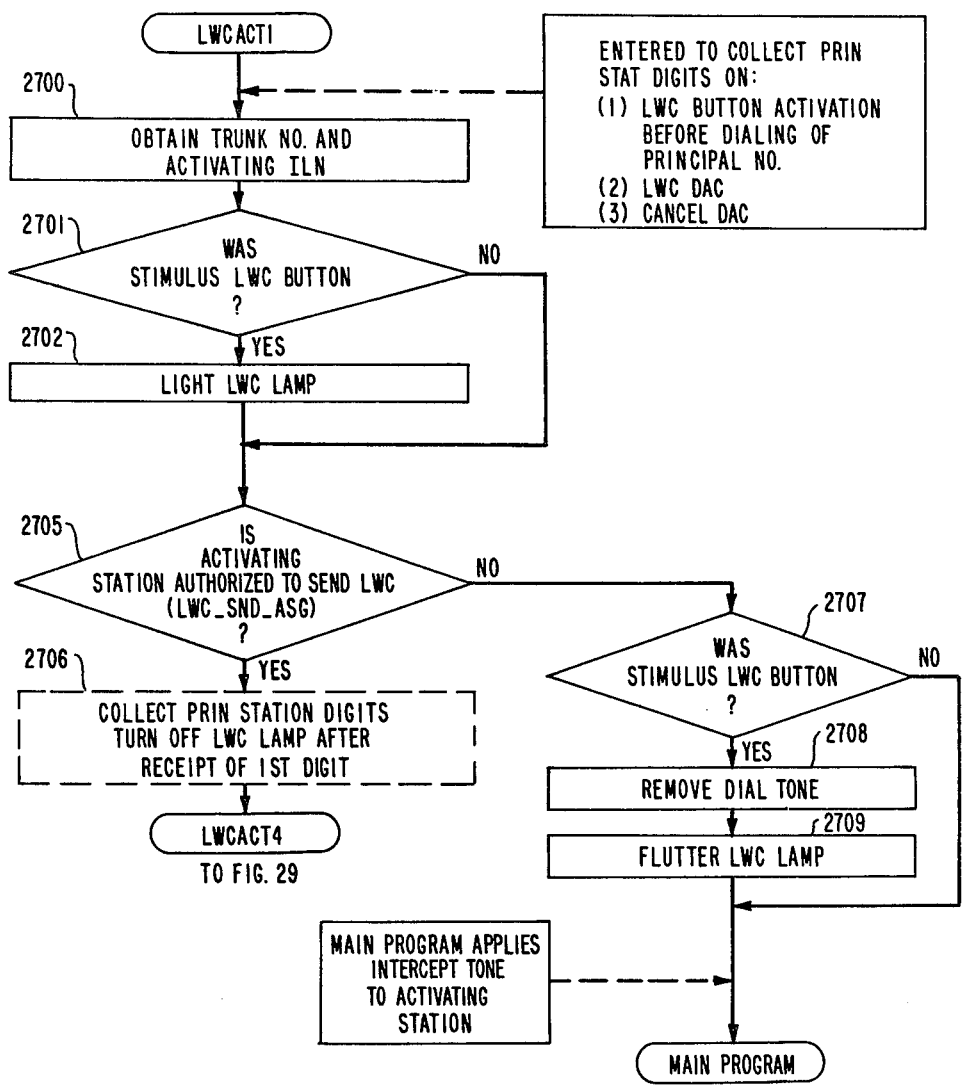
Figure 29:
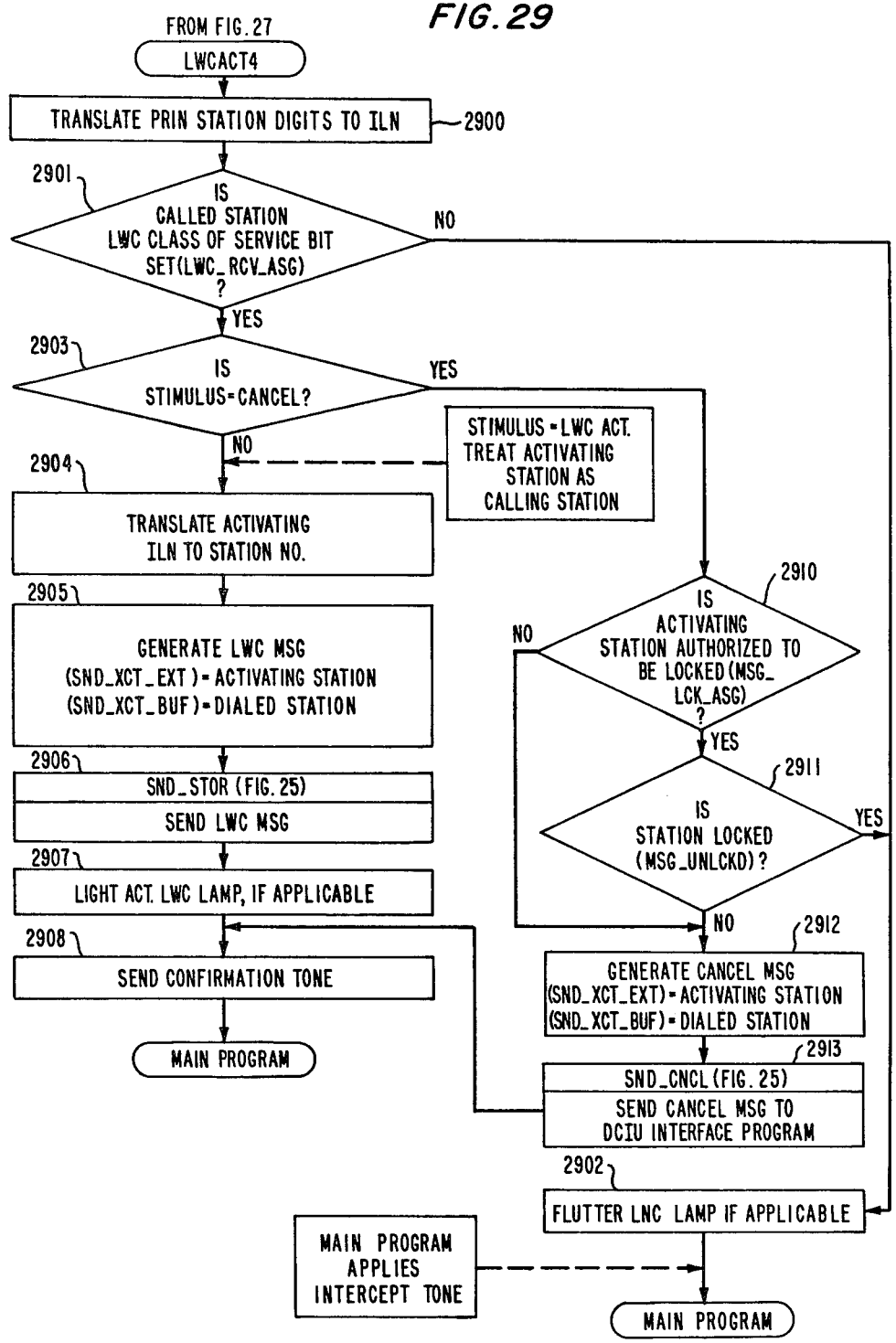

A station may activate the storage of an LWC message without ringing a principal station by first activating the LWC feature after going off-hook and before dialing the digits of the principal station for which a message will be stored. Program LWCACT1 in FIG. 27 is entered to collect the principal station digits as they are dialed as a result of a LWC activation before the dialing of the principal station digits. LWCACT1 is also entered to collect the principal station digits in the case of any LWC activation by dial access code (DAC) or on receipt of an LWC cancel DAC. The trunk number associated with the call and the ILN of the activating station is obtained at step 2700. If the stimulus causing entry to this program resulted from a LWC button, the LWC lamp on the activating station is lit at steps 2701 and 2702. If the activating station is authorized to send LWC messages (step 2705), the principal station digits are received from the activating station in real time as illustrated by the dotted box at step 2706. Thereafter, program entry is made to LWCACT4 in FIG. 29 to perform the LWC message generation or cancel function.

If the stimulus causing an entry to LWCACT1 is an LWC button operation (step 2707) and if the activating station is unauthorized to send LWC messages, (step 2705), the LWC request is denied. However, there may still be dial tone present at the activating station. Dial tone is ordinarily removed by the main program when the calling party starts to dial the principal station digits. The program therefore removes dial tone from the activating station at 2708 and flutters the LWC lamp at that station to signify denial and exits to a print in the main program where interrupt tone is applied.

LWCACT4 (FIG. 29) is entered after the principal station digits are collected at step 2706. The digits are translated to ILN at step 2900. At step 2901, LWC_RC-V_ASG is interrogated to determine if the principal station is authorized to receive LWC messages. If not, the request is denied. The LWC lamp at the activating station is fluttered at step 2902 if the station is a multifunction station and intercept tone is applied by the main program. Otherwise, it is next determined at step 2903 if the stimulus causing entry to LWCACT4 is an LWC cancel DAC. If not, the stimulus must be an LWC request, either by button or DAC. In this event the program translates the activating ILN to its station number at step 2904, generates the requested LWC message at step 2905 and sends it to the DCIU interface program at step 2906. It lights the activating LWC lamp if applicable at step 2907, sends a confirmation tone to the activating station at 2908 and exits to the main program having accomplished the requested function.

If the above stimulus is a cancel DAC, the principal station digits received at step 2706 as part of the request, together with the station number of the activating station define which LWC message stored in AP 103 to cancel. A cancel request causes execution of step 2910 where item MSG_LCK_ASG is interrogated to determine if the activating station is authorized to be locked. A locked station may neither retrieve LWC messages nor cancel LWC messages. Therefore, if the station can be locked, it is determined at step 2911 from item MSG_UNLCKD if the station is in fact locked. If so, the program exits via step 2902. If the station is unlocked, or cannot be locked as determined at step 2910, a cancel message is generated at step 2912. This message is sent to the DCIU interface program at step 2913 by subroutine SND_CNCL. SND_CNCL is shown in FIG. 25. At step 2502 this subroutine sets the message type item SND_XCT_TYPE to indicate a cancel message. It then moves the message to the DCIU and returns to the calling program where a confirmation tone is sent at step 2908 which completes the cancellation request.

Figure 28:
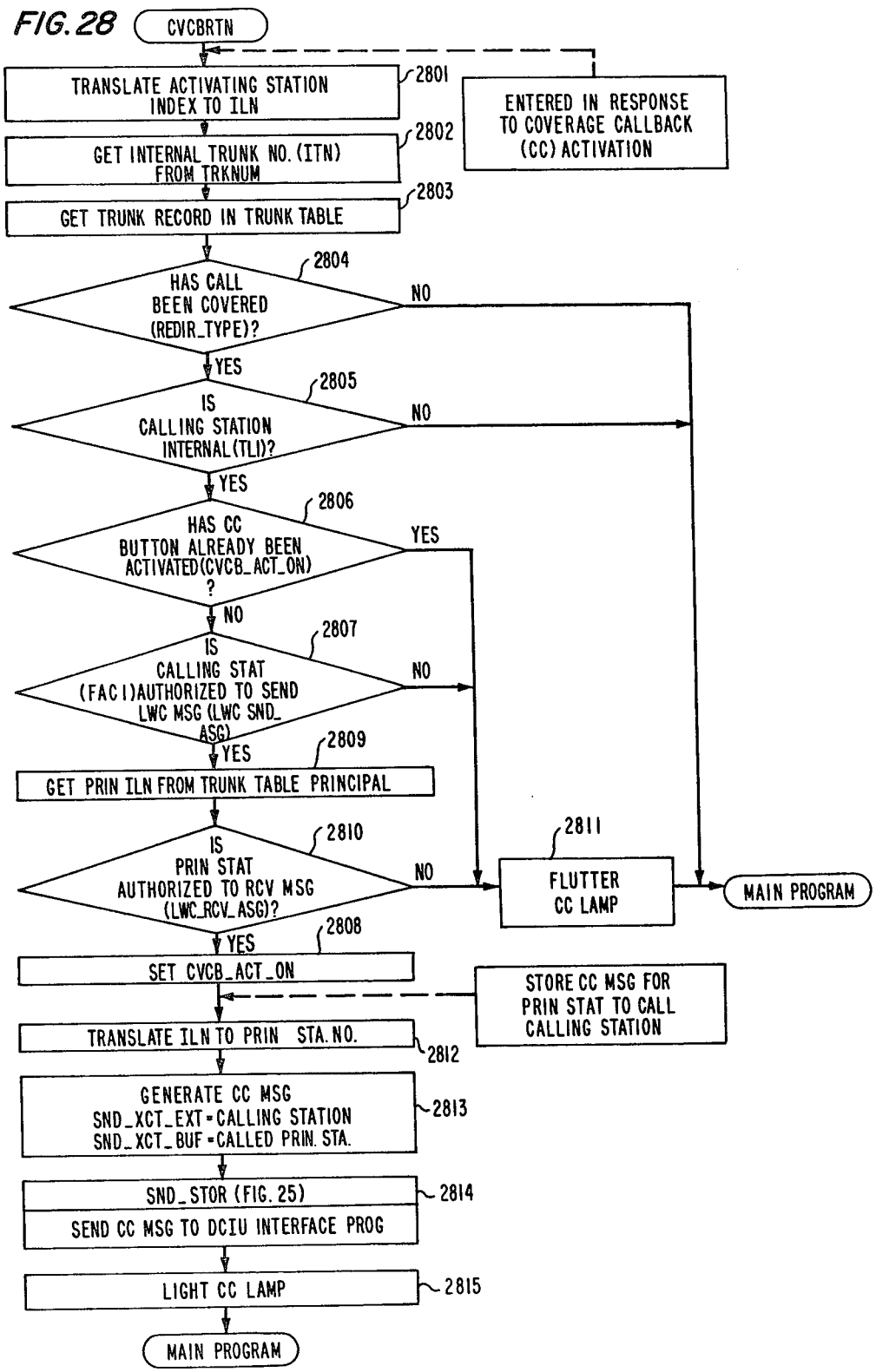

A coverage callback (CC) message activated at a covering station is similar to a LWC message activated at the covering station except that it requests a principal to return a call to a calling party rather than to the covering activator of the feature. For example, in the previously described call from station 1001 to station 901, which was covered at station 902, the covering party at 902 might operate the CC button instead of the LWC button to advise the station 901 principal to call the 1001 party. Operation of the CC feature button is detected by the system and entry is made to program CVCBRTN in FIG. 28. This program is given the activating station index as an input parameter. CVCBRTN first translates the activating station index to the ILN at step 2801. At step 2802, it uses the ILN to obtain the trunk table index (ITN) from item TRKNUM in line status table LSTWD1 if a trunk record exists on the call. If there is no trunk record, the button operation is ignored. Using the ITN the program obtains the trunk record at step 2803. At steps 2804 and 2805, the program determines from items REDIR_TYPE and TL1 if the call in question has been redirected to coverage and if the calling station is an internal station. A coverage callback button activation has no meaning if a call has not been redirected to coverage. Moreover, coverage callback messages will not be generated for external calling stations. Therefore, if either of these checks are negative, CVCBRTN ignores the CC stimulus and exits to the main program. At steps 2806 and 2807 the program determines if a CC message has already been generated on this call, and if the calling station is authorized to send LWC type messages. If a CC message has already been activated or if the calling station is not authorized, the program alerts the activating party that the request is denied by fluttering the CC lamp on the activating station at step 2811.

At step 2809, in preparation for an implied principal addressing operation, the program identifies the principal station 901 by reading item PRINCIPAL in the trunk record. The principal station's authorization to receive LWC messages is checked at step 2810 and the CC request is denied if the principal station is unauthorized.

If all of the above tests are successful, the program proceeds to generate and store the CC message. It sets CVCB_ACT_ON at step 2808. At step 2812, it translates the ILN of the principal station to the appropriate directory number. It generates the CC message at 2813 by storing the principal station number in SND_XCT_BUF and the calling station number in SND_XCT_EXT. It then calls subroutine SND_STOR at step 2814 to send the CC message to the DCIU interface program. This completes storing of the message. The program lights the CC lamp on the activating station at step 2815 to indicate completion and exits to the main program.

Figure 31:
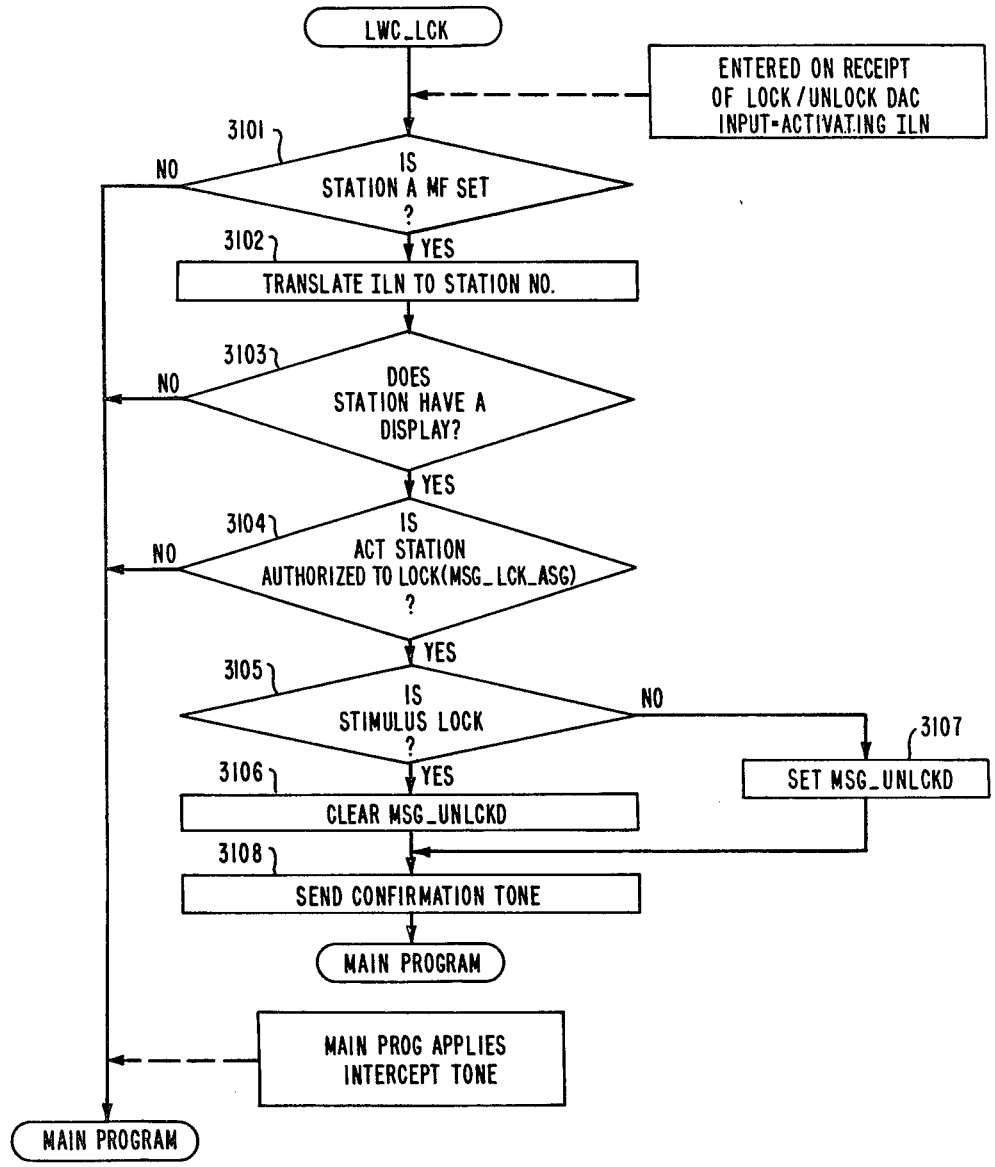
FIG. 31 shows the program flowchart responsible for placing stations in locked and unlocked states to control the unauthorized retrieval of stored LWC type messages.

A station is placed in a locked mode by the execution of program LWC_LCK in FIG. 31 which is entered as a result of the receipt of a lock/unlock DAC stimulus. The activating ILN is given to the program as an input parameter. Only multifunction stations are allowed to be placed in a locked mode. This determination is made at step 3101. If the station is a multifunction station, the ILN is translated to station number at step 3102 and a determination is made at step 3103 as to whether or not the station has a display set. If the activating station is unauthorized to be placed in a locked mode as determined at step 3104 from item MSG_LCK_ASG, the request is denied. Otherwise, the DAC stimulus is interrogated at step 3105 as to whether a lock or unlock request was made. MSG_UNLCKD is set or cleared accordingly at steps 3106 or 3107 to place the station in the correct mode, confirmation tone is sent to the activating station at 3108 and program execution is completed.

MESSAGE RETRIEVAL

The automatic message waiting (AMW) lamp on a station is automatically lit whenever LWC, CC or message center messages are stored in applications processor 103 for the station. A principal whose station is equipped with a display module may obtain LWC and CC messages on the display module. Since the display is illustratively a 40 alphanumeric character display, message center messages having no more than 40 characters may also be obtained at the display set. Agents, such as a secretary or a MC operator may be called to retrieve messages if a principal does not have a display.

Figure 32:
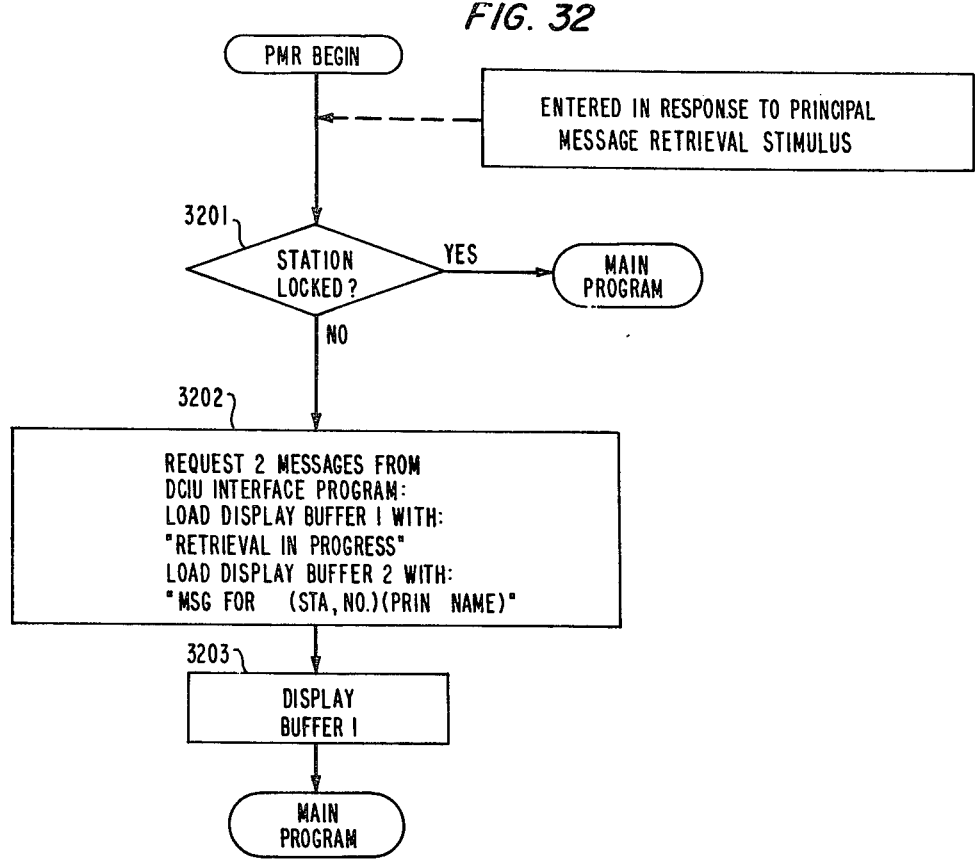
FIGS. 32 through 36 show message retrieval program flowcharts.

To initiate a message retrieval, a party operates the message retrieval button 306 on the display module. An agent, such as a secretary, would operate the coverage message retrieval button 307. This creates a stimulus which subsequently causes an entry to program PMRBEGIN shown in FIG. 32. If the station is locked as determined at step 3201, the request is denied. Otherwise, PMRBEGIN sends a message to the DCIU interface program requesting the first two messages stored for this principal station. The display module consists of three display buffers. The contents of a buffer are displayed when that buffer is selected by command to the display module under control of the program. At step 3202, PMRBEGIN loads buffer one with the message "retrieval in progress" and it loads display buffer two with "message for (station number) (principal name)". The displayed station number is that number given to PMRBEGIN upon program entry. The displayed principal name is read from a principal name database where names associated with station numbers are stored. The principal name database illustratively is maintained in control processor memory 108. At step 3203, PMRBEGIN sends a command to the station to select buffer one for display. It then exits to the main program awaiting receipt of the two messages requested from the DCIU interface program.

Figure 33:
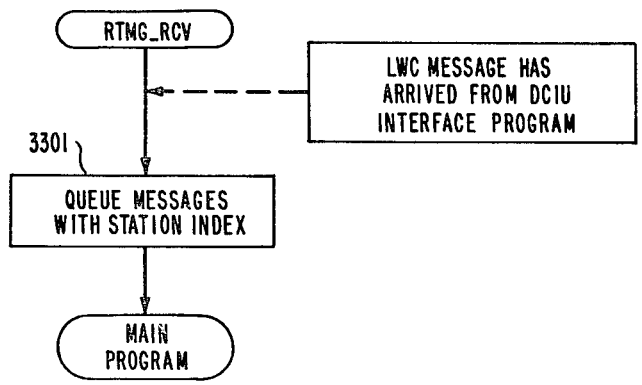
Figure 34:
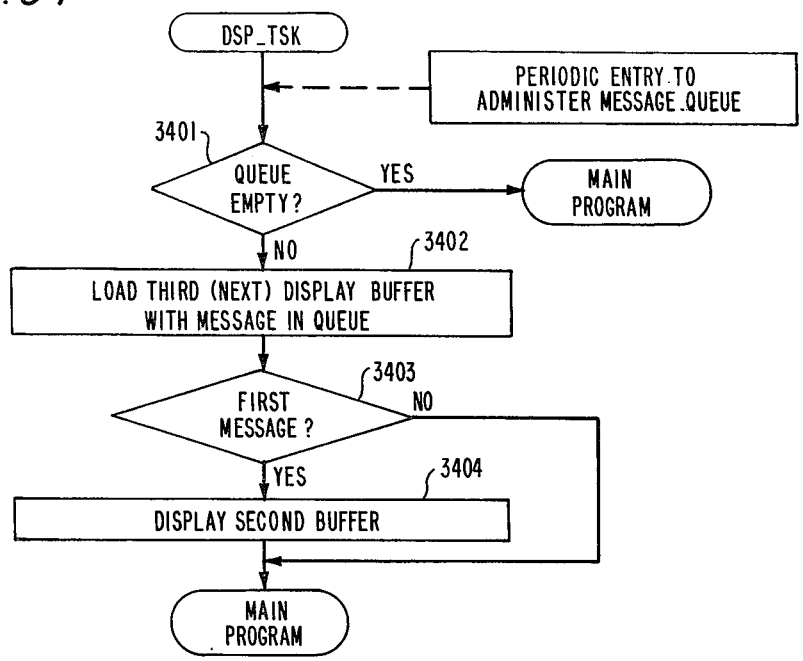
Figure 35:
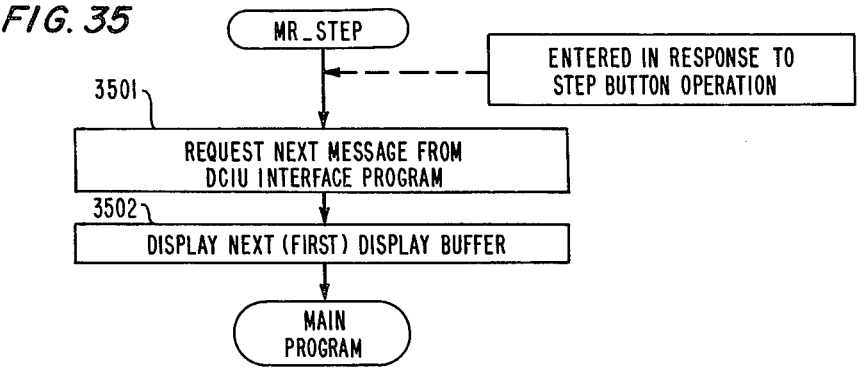

When a first message arrives from applications processor 103 to the DCIU interface program via data channel 111 and DCIU 110, the DCIU interface program causes an entry to be made to RTMG_RCV in FIG. 33. This program queues the message in a message queue (not shown) at 3301 and exits. Each arriving message causes a similar entry to RTMG_RCV where the message is queued. Program DSP_TSK in FIG. 34 is periodically entered from the main program to administer the message queue. The program determines at step 3401 if the queue is empty. If not, it loads the next display buffer (which is the third display buffer for the first message returned from AP 103) with the top message in the queue for this station. If this is the first message to be returned (step 3403), DSP_TSK sends a command to the display module at step 3404 to display the second buffer, which it is recalled contains a message identifying the principal and the principal station number. If the message loaded into the next buffer is not the first message responsive to the display request, DSP_TSK takes no further action and returns to the main program. Each subsequent display thereafter is made in response to an operation of the step button 309 on the display module. Assuming such a step button operation is made by the principal, entry is made to MR_STEP in FIG. 35. At 3501, a request is made to the DCIU interface program for the next message stored in the applications processor 103 for this station. The message in the next display buffer at the principal station is next displayed at step 3502 by a command from MR_STEP. This completes execution of MR_STEP in response to the one step button operation. Execution of MR_STEP is repeated thereafter in response to each step button operation until the display mode is exited.

Figure 36:
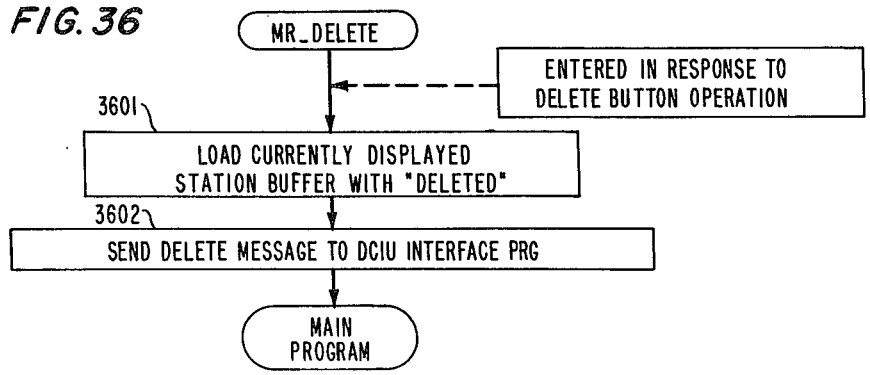

Messages that are displayed are retained in applications processor 103 unless deleted in response to an operation of the display set delete button 308. An operation of the delete button causes entry to program MR_DELETE in FIG. 36. This program displays the term DELETED at the display set by loading the current display buffer and sends a delete message to the DCIU interface program at steps 3601 and 3602. The details of which message to delete in applications processor 103 are included in the message to the DCIU interface program.

It is to be understood that the above-described arrangement is merely illustrative of the application of the principles of the invention and that other arrangements may be devised by those skilled in the art without departing from the spirit and scope of the invention.

What is claimed is:

1. A method of providing call coverage service for a principal station in a telephone system having a storage memory and serving a plurality of stations, comprising the steps of storing call coverage criteria in memory specifying conditions under which calls directed to the principal station will be redirected to coverage, storing in memory identifications of a plurality of call covering stations for the principal station and an order of preference of the call covering stations, and in response to a call intended for the principal station from a calling station and satisfying the coverage criteria, redirecting the call to coverage from the principal station sequentially to each of the covering stations in the order of preference until the call is answered or abandoned.

2. The invention of claim 1 wherein the redirecting step comprises redirecting the call first to a first preferred one of the covering stations when a coverage criterion is satisfied, and thereafter redirecting the call from the first preferred covering station to the next preferred covering station responsive to a prescribed condition at the first preferred covering station.

3. The invention of claim 1 wherein the coverage criteria storing step further comprises:

storing criteria specifying conditions relating to both the state of the principal station and to the class of the call directed to the principal station.

4. The invention of claim 2 wherein the step of redirecting the call to the first preferred covering station further comprises the steps of:

alerting the calling station that the call is scheduled to be redirected to coverage, providing a prescribed interval of time immediately following the alerting at the expiration of which the call is redirected to coverage, and disposing of the call in accordance with a prescribed signal received during the prescribed interval of time.

5. The invention of claim 1 wherein said method further comprises directing the call to the principal station if the call does not initially satisfy a coverage criterion, and redirecting the call from the principal station to coverage responsive to receipt of a prescribed signal from the principal station.

6. The invention of claim 5 wherein the principal station is equipped with a send-all-calls (SAC) button for generating the prescribed signal.

7. The invention of claim 2 further comprising redirecting the call from the first preferred covering station to the next preferred covering station after a prescribed period of time during which the call is not answered at the first preferred covering station.

8. The invention of claim 2 wherein the first preferred covering station has a send-all-calls feature button and the method further comprises redirecting the call from the first preferred covering station to the next preferred covering station responsive to an activated state of the send-all-calls button.

9. The invention of claim 2 further comprising the steps of ascertaining whether a call to a given station is directed to the station as a principal station or redirected to the station as a covering station, interrogating the coverage criteria for the station if the call is to the station as a principal station, and omitting the last-mentioned interrogating step if the call is to the station as a covering station.

10. The invention of claim 2 or claim 9 wherein the step of redirecting the call to the first preferred covering station further comprises the step of storing in a memory location (REDIR_TYPE) associated with the call an indication that the call is being redirected.

11. The invention of claim 10 wherein the ascertaining step further comprises the step of interrogating the redirected call indication.

12. The invention of claim 1 further comprising the step of testing for the availability of each covering station before redirecting the call to that covering station.

13. The invention of claim 12 wherein each covering station has one or more call appearances and said availability testing further comprises the step of testing for an idle one of said call appearances.

14. The invention of claim 12 wherein each covering station has a send-all-calls feature button or capability, and said availability testing further comprises the step of ascertaining the send-all-calls status of the covering station.

15. The invention of claim 3 further comprising the steps of ascertaining the state of the principal station and the class of the call responsive to arrival of the call, and executing a step selected from the following list of steps in accordance with the call coverage criteria;

a. directing the call only to the principal station;

b. redirecting the call only to coverage; or c. directing the call first to the principal station and then redirecting the call to coverage if the principal station is not answered within a specified period of time.

16. The invention of claim 15 wherein the class of the arriving call is defined as external if the call originates from a station not served by the telephone system and is defined as internal if the call originates from a station served by the telephone system.

17. The invention of claim 16 wherein the ascertaining step further comprises the step of determining from the coverage criteria if the arriving call should be immediately redirected to coverage.

18. The invention of claim 17 wherein the coverage criteria comprise a COVER ALL EXTERNAL CALLS flag (CALL_EXT) and the immediate redirection determining step comprises the steps of determining if the arriving call is an external call and, if so, controlling the redirection if the CALL_EXT flag is in a prescribed state.

19. The invention of claim 17 wherein the coverage criteria comprise a COVER ALL INTERNAL CALLS flag (CALL_INT) and the immediate redirection determining step comprises the steps of determining if the arriving call is an internal call and, if so, controlling the redirection of the arriving call if the CALL_INT flag is in a prescribed state.

20. The invention of claim 17 wherein the principal station comprises plural call appearances of its station line and the system is operative to establish independent calls to each of the appearances simultaneously, in which the principal station state is defined to be active if one or more of the appearances are associated with calls, and the principal station state is defined to be busy if all of the appearances are associated with calls, wherein the coverage criteria comprise a COVER EXTERNAL CALLS ACTIVE (CACT_EXT) flag and the immediate redirection determining step comprises the steps of determining if the arriving call is an external call and if so, controlling the redirection of the arriving call if the CACT_EXT flag is in a prescribed state and the principal station is in an active state.

21. The invention of claim 17 wherein the principal station comprises plural call appearances of its station line and the system is operative to establish independent calls to each of the appearances simultaneously, in which the principal station state is defined to be active if one or more of the appearances are associated with calls, and the principal station state is defined to be busy if all of the appearances are associated with calls, wherein the coverage criteria comprises a COVER INTERNAL CALL ACTIVE flag (CACT_INT) and the immediate redirection determining step comprises the steps of determining if the arriving call is an internal call and, if so, controlling the redirection of the arriving call if the CACT_INT flag is in a prescribed state and the principal station is in an active state.

22. The invention of claim 20 wherein the coverage criteria comprise a COVER EXTERNAL CALL BUSY flag (CBSY_EXT) and the immediate redirection determining step comprises the steps of determining if the arriving call is an external call and, if so, controlling the redirection of the arriving call if the CBSY_EXT flag is in a prescribed state and the principal station is in a busy state.

23. The invention of claim 21 wherein the coverage criteria comprise a COVER INTERNAL CALL BUSY flag (CBSY_INT) and the immediate redirection determining step comprises determining if the arriving call is an internal call and, if so, controlling the redirection of the arriving call if the CBSY_INT flag is in a prescribed state and the principal station is in a busy state.

24. The invention of claim 15 wherein the ascertaining step further comprises the step of determining from the coverage criteria if the arriving call should be redirected to coverage if the principal station is not answered within a prescribed period of time.

25. The invention of claim 16 wherein the coverage criteria comprise a COVER ON DOESN'T ANSWER EXT flag (CDA_EXT) and step c of claim 15 further comprises determining if the arriving call is an external call and, if so, activating a timing function to time the specified period of time if the CDA_EXT flag is in a prescribed state.

26. The invention of claim 16 wherein the coverage criteria comprise a COVER ON DOESN'T ANSWER INT flag (CDA_INT) and step c of claim 15 further comprises determining if the arriving call is an internal call and, if so, activating a timing function to time the prescribed period of time if the CDA_INT flag is in a prescribed state.

27. The invention of claim 4 in which the telephone system includes program means activatible by said prescribed signal from each of the stations for generating and storing in the memory a call message including the identities of an activating station of said program means and the principal station and wherein the call disposing step further comprises the step of initiating control of the program means responsive to receipt of said prescribed signal during the prescribed time interval.

28. The invention of claim 4 in which the call disposing step further comprises the step of cancelling the call in the telephone system responsive to an on-hook signal from the calling station before expiration of the prescribed time interval.

29. The invention of claim 4 in which the call disposing step further comprises the step of redirecting the call to coverage responsive to expiration of the prescribed time interval when the calling station is off-hook.

30. The invention of claim 4 in which the call disposing step further comprises the step of completing the call to the principal station responsive to an off-hook signal from the principal station received during the prescribed time interval.

31. The invention of claim 6 further comprising the step of redirecting a call from a first preferred covering station in the order of preference to the next preferred covering station in the order of preference responsive to an operation of the SAC button at the first preferred covering station.

32. The invention of claim 5 or claim 31 wherein a said station comprises plural call appearances of its station line and the system is operative to establish independent calls to each of the appearances simultaneously and the method further comprises the step of redirecting all calls at different ones of the call appearances of said station that are in a call alerting state.

33. The invention of claim 1 wherein the telephone system is a customer premises telephone system.

34. A telephone system serving a plurality of stations and comprising a processor (107), a memory (108), program means (FIGS. 4-6; 13-21, 37-41) stored in the memory for controlling the processor to provide call coverage for calls directed to the stations, said program means comprising table means (LXLN6, COVRTBL0) for storing call coverage criteria specifying circumstances under which a call directed to a principal one of the stations will be redirected to call coverage, table means (COVRTBL1 through COVRTBL3) for storing the identity of a plurality of call covering stations for the principal station and an indication of the order of preference of the call covering stations, and wherein the program means comprises means responsive to a call directed to the principal station and satisfying a coverage criterion for redirecting the call sequentially to each of the covering stations until the call is answered or abandoned.

35. The invention of claim 34 wherein the call redirecting means further comprises means responsive to a signal from one of the covering stations while the covering station is being alerted of the arrival of the call for redirecting the call from that covering station to the next covering station in the order of preference.

36. The invention of claim 34 wherein the program means further comprises means responsive to a signal from the principal station while the principal station is being alerted on a second arriving call for activating the call coverage redirecting means.

37. The invention of claim 34 wherein the call redirecting means further comprises means (FIG. 15) for providing a prescribed interval of time after the coverage criterion is satisfied and before the call is redirected to coverage.

38. The invention of claim 34 wherein the coverage criteria table means further comprises means for storing coverage criteria relating to both the class of the call (CVR_EXT, CVR_INT) and to the state of the principal station (CBSY_EXT, CACT_EXT, CBSY_INT, CACT_INT).

* * * * *

UNITED STATES PATENT AND TRADEMARK OFFICE
CERTIFICATE OF CORRECTION

PATENT NO. : 4,436,962
DATED : March 13, 1984
INVENTOR(S) : Richard A. Davis - Susan K. Harris - Bernard R. Jones It is certified that error appears in the above—identified patent and that said Letters Patent is hereby corrected as shown below:

Column 8, line 20, "for a the" should read --for the--. Column 9, line 24, "TOLL$_{14}$BIT" should read --TOLL_BIT--. Column 10, line 6, "SAC$_{14}$QPTR" should read --SAC_QPTR--; line 23, "LAST$_{14}$NUM" should read --LAST_NUM--. Column 11, line 60, "ta-" should read --sta- --. Column 17, line 38, "SAC$_{14}$TASK" should read --SAC_TASK--. Column 21, line 51, "LAST$_{14}$NUM" should read --LAST_NUM--.

Signed and Sealed this

Thirtieth Day of October 1984

[SEAL]

Attest:

Attesting Officer

GERALD J. MOSSINGHOFF

Commissioner of Patents and Trademarks